United States Patent
Tang et al.

(10) Patent No.: US 12,212,239 B2
(45) Date of Patent: Jan. 28, 2025

(54) METHODS AND APPARATUS TO REDUCE REVERSE RECOVERY DURING THE OPERATION OF AN INVERTING BUCK BOOST CONVERTER

(71) Applicant: Texas Instruments Incorporated, Dallas, TX (US)

(72) Inventors: Hua Tang, Shenzhen (CN); Shanguang Xu, Plano, TX (US); Zhaofu Zhou, Shenzhen (CN); Teng Feng, Shenzhen (CN); Ian Lloyd Bower, Bedford, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 154 days.

(21) Appl. No.: 17/587,702

(22) Filed: Jan. 28, 2022

(65) Prior Publication Data
US 2023/0041194 A1   Feb. 9, 2023

Related U.S. Application Data

(60) Provisional application No. 63/229,739, filed on Aug. 5, 2021.

(51) Int. Cl.
*H02M 3/158* (2006.01)
*H02M 1/00* (2007.01)

(52) U.S. Cl.
CPC ....... *H02M 3/1582* (2013.01); *H02M 1/0051* (2021.05)

(58) Field of Classification Search
CPC .. H02M 3/158; H02M 3/1582; H02M 3/1584; H02M 1/0048; H02M 1/0051; H02M 1/34; H02M 1/342; H02M 1/344
See application file for complete search history.

(56) References Cited

U.S. PATENT DOCUMENTS

| | | | | |
|---|---|---|---|---|
| 5,410,467 A | * | 4/1995 | Smith | H02M 3/33576 363/16 |
| 6,144,565 A | * | 11/2000 | Lethellier | H02M 3/158 363/16 |
| 6,522,109 B2 | * | 2/2003 | Tanaka | H02M 1/34 323/225 |

(Continued)

OTHER PUBLICATIONS

IEEE Standard Dictionary of Electrical and Electronics Terms, vol. PAS-99, Issue: 6, Nov. 1980, pp. 246-247 (Year: 1980).*

(Continued)

*Primary Examiner* — Gustavo A Rosario-Benitez
(74) *Attorney, Agent, or Firm* — Charles F. Koch; Frank D. Cimino

(57) ABSTRACT

An example apparatus includes: a first and second capacitor; a first and second inductor; a first switch having a first and second terminal, the first terminal coupled to the first capacitor, and the second terminal coupled to the first and second inductor; a second switch having a third and fourth terminal, the third terminal coupled to the second terminal, the fourth terminal coupled to the second capacitor; a third switch having a fifth and sixth terminal, the fifth terminal coupled to the first terminal, the sixth terminal coupled to the second inductor; and a diode having a seventh and eighth terminal, the seventh terminal coupled to the sixth terminal, the eighth terminal coupled to the fourth terminal.

20 Claims, 17 Drawing Sheets

(56) References Cited

U.S. PATENT DOCUMENTS

| | | | | |
|---|---|---|---|---|
| 2012/0099348 A1* | 4/2012 | Umetani | ............... | H02M 3/158 |
| | | | | 363/37 |
| 2012/0155139 A1* | 6/2012 | Boeke | ................... | H02M 7/217 |
| | | | | 323/311 |
| 2014/0152271 A1* | 6/2014 | Jeong | ................... | H02M 7/066 |
| | | | | 323/207 |
| 2020/0169171 A1* | 5/2020 | Fromme | ............... | H02M 3/158 |
| 2021/0091653 A1* | 3/2021 | He | ....................... | H02M 1/0051 |
| 2023/0058431 A1* | 2/2023 | Yun | ....................... | H02M 3/158 |

OTHER PUBLICATIONS

Infineon, "XDPP1100 two-phase interleaved buck-boost" retrieved from, www.infineon.com/xdpp1100, Sep. 20, 2021, 46 pages.

\* cited by examiner

STAGE 1: S1 OFF, S2 ON, S3 OFF

STAGE 2: S1 OFF, S2 ON, S3 ON

STAGE 3: AT THE BEGINNING OF (S1 OFF, S2 OFF, S3 ON)

STAGE 6: AT THE BEGINNING OF (S1 ON, S2 OFF, S3 OFF)

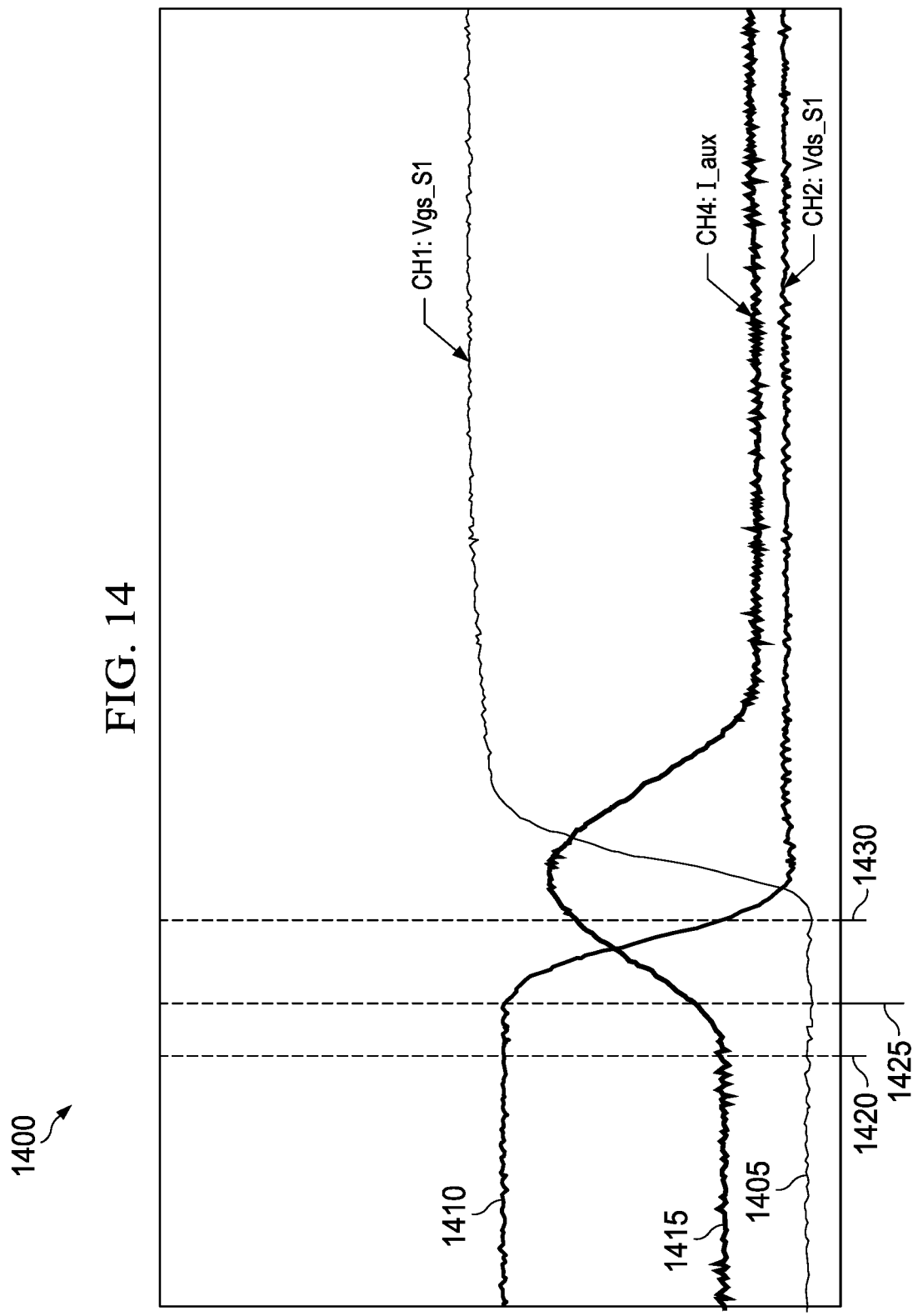

METHODS AND APPARATUS TO REDUCE REVERSE RECOVERY DURING THE OPERATION OF AN INVERTING BUCK BOOST CONVERTER

CROSS-REFERENCE TO RELATED APPLICATION

This patent application claims the benefit of and priority to U.S. Provisional Patent application Ser. No. 63/229,739 filed Aug. 5, 2021, which is hereby incorporated herein by reference in its entirety.

TECHNICAL FIELD

This description relates generally to continuous conduction mode (CCM) operation, and more particularly to methods and apparatus to reduce reverse recovery during the operation of an inverting buck boost converter.

BACKGROUND

Power supplies configured for telecom power amplifiers generate a positive output voltage (e.g., 28 volts to 48 volts) as a result of a negative input voltage (e.g., −48 volts). The telecom power amplifier may include an inverting buck boost (IBB) converter to invert a magnitude of an input voltage to generate an output voltage. The IBB converter may be configured to convert a negative input voltage to a positive output voltage or vice versa. The IBB converter may be configured to operate in a critical conduction mode, discontinuous conduction mode, or a continuous conduction mode (CCM). Applications such as the telecom power amplifier typically include an IBB converter configured for CCM operation. CCM operation is a mode of operation in which a current is always stored in an inductor in the IBB converter, such that a switching method may be implemented to generate a continuous voltage at an output of the IBB converter. A conventional switching method may be implemented by a controller coupled to an IBB converter to enable CCM operation. The conventional switching method typically results in a voltage and/or current spike on the output as a result of reverse recovery of the transistors during the switching process.

SUMMARY

For methods and apparatus to reduce reverse recovery during the operation of an inverting buck boost converter, an example apparatus includes a first and second capacitor; a first and second inductor; a first switch having a first and second terminal, the first terminal coupled to the first capacitor, and the second terminal coupled to the first and second inductor; a second switch having a third and fourth terminal, the third terminal coupled to the second terminal, the fourth terminal coupled to the second capacitor; a third switch having a fifth and sixth terminal, the fifth terminal coupled to the first terminal, the sixth terminal coupled to the second inductor; and a diode having a seventh and eighth terminal, the seventh terminal coupled to the sixth terminal, the eighth terminal coupled to the fourth terminal.

BRIEF DESCRIPTION OF THE DRAWINGS

FIG. 14 is a timing diagram of a fourth example operation of the IBB converter of FIGS. 1 and 2.

DETAILED DESCRIPTION

Figure 1:
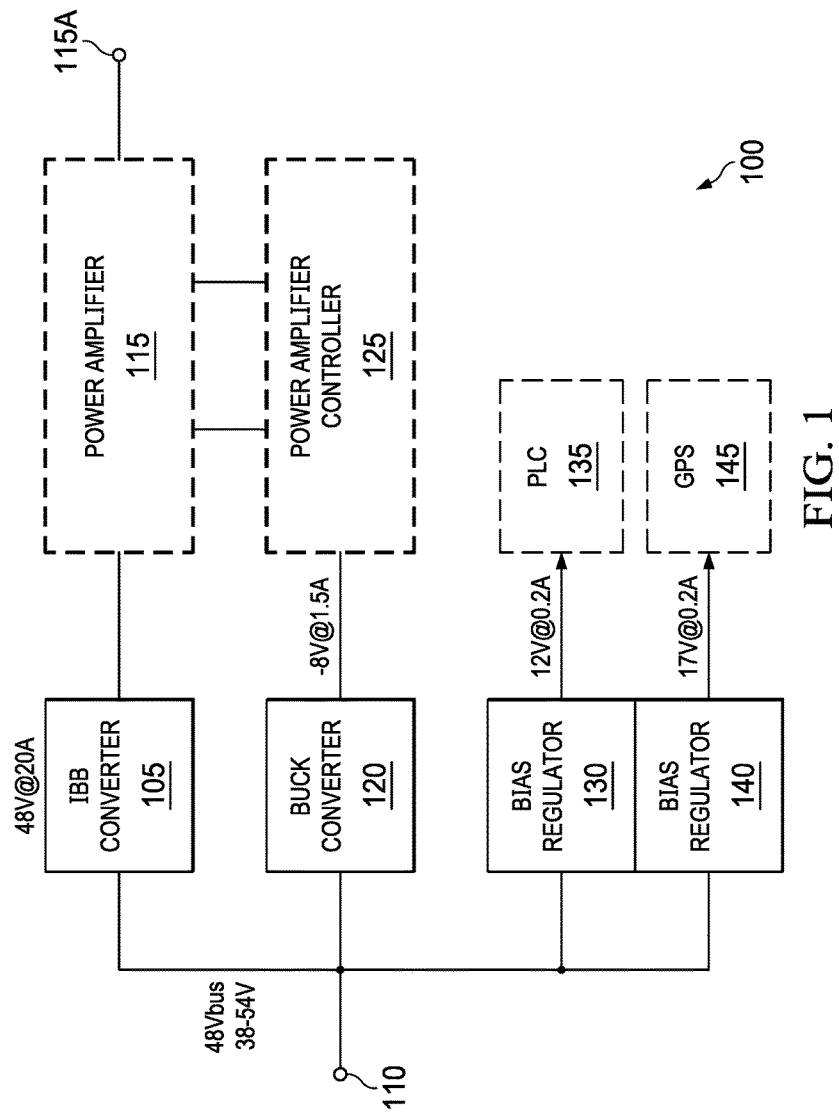
FIG. 1 is a block diagram of an example power delivery system including an example inverting buck boost (IBB) converter.

The drawings are not necessarily to scale. Generally, the same reference numbers in the drawing(s) and this description refer to the same or like parts. Although the drawings show layers and regions with clean lines and boundaries, some or all of these lines and/or boundaries may be idealized. In reality, the boundaries and/or lines may be unobservable, blended and/or irregular.

Power supplies configured for telecom power amplifiers generate a positive output voltage (e.g., 28 volts to 48 volts) as a result of a negative input voltage (e.g., −48 volts). The telecom power amplifier typically includes an inverting buck boost (IBB) converter to invert a magnitude of an input voltage to generate an output voltage. The IBB converter may be configured to convert a negative input voltage to a positive output voltage or vice versa. For example, the IBB converter in a power amplifier may be configured to convert an approximately −48-volt (V) input voltage into a 28V output voltage. An IBB converter may be configured as a step-up (boost) or a step-down (buck) converter. A step-up converter is a converter that converts a first voltage of a first magnitude into a second voltage of a second magnitude, such that the second magnitude is greater than the first magnitude. A step-down converter is a converter that converts a first voltage of a first magnitude into a second voltage of a second magnitude, such that the first magnitude is greater than the second magnitude.

The IBB converter may be configured to operate in a critical conduction mode, discontinuous conduction mode, or a continuous conduction mode (CCM). Applications such as power supplies configured for telecom power amplifiers typically include an IBB converter configured for CCM operation. CCM operation is a mode of operation in which a current is always stored in an inductor in the IBB converter circuitry, such that the inductor never fully discharges. The IBB converter may partially discharge the inductor before switching to an output capacitor, such switching may be referred to as a switching method.

A conventional switching method may be implemented to enable CCM operation in the IBB converter using a first switch to charge an inductor and a second switch to discharge the inductor to an output terminal. The conventional switching method typically results in a current spike across the second switch of the IBB converter as a result of reverse biasing a body diode of the second switch, such reverse biasing may be referred to as a freewheeling switch. The freewheeling switch generates the current spike during CCM operation as a result of the reverse biasing the body diode before the current reduces to approximately 0 amps (A). The switches in the IBB converter may be transistors, such that the second switch may be referred to as a freewheeling field effect transistor (FET). A body diode of the freewheeling FET may be configured to enable current to be supplied by the inductor as a result of the first switch being opened, such that the body diode generates a voltage and/or current spike during a recovery from the reverse bias current. The IBB converter power efficiency is reduced by voltage and/or current spike resulting from the reverse recovery of the body diode.

The example IBB converter disclosed herein, includes a first switch, a second switch, and an auxiliary circuit to reduce the current supplied by a body diode of the second switch to approximately 0 amps (A) before reverse biasing the body diode of the second switch during the switching process. The auxiliary circuit is configured to transfer the current flowing through the second switch, the energy stored in a body diode of the second switch, and an output capacitance of the second switch, to an auxiliary inductor, such that no reverse bias is applied to the second switch during the switching process. The auxiliary circuit is configured to initiate the power transfer to the auxiliary inductor as a result of enabling an auxiliary switch. Alternatively, the auxiliary switch may be disabled to transfer the power stored in the auxiliary inductor to an output of the IBB converter through an auxiliary diode. Advantageously, the power stored in the auxiliary inductor is transferred to an output terminal of IBB converter through a diode and the first switch to keep a capacitor charged enough to resist sudden voltage and/or current spikes on the IBB converter output.

FIG. 1 is a block diagram of an example power delivery system 100 including an example inverting buck boost (IBB) converter 105. In the example of FIG. 1, the power delivery system 100 includes the IBB converter 105, an example supply input terminal 110, an example power amplifier 115, an example buck converter 120, an example power amplifier controller 125, an example first bias regulator 130, an example programmable logic controller (PLC) 135, a second bias regulator 140, and an example global positioning system (GPS) 145. The power delivery system 100 is configured to supply power at a power amplifier output terminal 115A of the power amplifier 115 as a result of power being supplied to the supply input terminal 110.

In the example of FIG. 1, the IBB converter 105 is coupled between the supply input terminal 110 and the power amplifier 115. The IBB converter 105 is configured to convert the power supplied to the supply input terminal 110 into a power supply for the power amplifier 115. For example, the IBB converter 105 may convert a −38V supply from the supply input terminal 110 to a 48V at 20 Amps (A) supply for the power amplifier 115. Advantageously, the IBB converter 105 enables a voltage of the power supplied to the supply input terminal 110 to be of a magnitude greater than or less than a magnitude of the voltage supplied to the power amplifier 115.

The power amplifier 115 is coupled to the IBB converter 105 and the power amplifier controller 125. The power amplifier 115 is configured to generate an output on the power amplifier output terminal 115A as a result of receiving power from the IBB converter 105. The power amplifier 115 may be configured to amplify the power of an input signal from the power amplifier controller 125, such that the power amplifier output terminal 115A may be coupled to additional circuitry (e.g., a transmitter, a buffer, etc.).

The buck converter 120 is coupled between the supply input terminal 110 and the power amplifier controller 125. The buck converter 120 is configured as a step-down converter, such that a magnitude of the voltage of the output is less than a magnitude of the voltage of the input. For example, the buck converter 120 steps down a −38V supply from the supply input terminal 110 to −8V at 1.5 A to supply the power amplifier controller 125.

The power amplifier controller 125 is coupled to power amplifier 115 and the buck converter 120. The power amplifier controller 125 is configured to control the power amplifier 115, such that the power amplifier output terminal 115A of the power amplifier 115 may represent an amplified digital or analog signal. For example, the power amplifier controller 125 enables the power amplifier 115 to generate an amplified digital signal, such that the amplified digital signal may traverse a transmission line.

The first bias regulator 130 is coupled between the supply input terminal 110 and the PLC 135. The first bias regulator 130 is configured as a step-down converter, such that a magnitude of an input voltage is greater than a magnitude of an output voltage. For example, the first bias regulator 130 steps down a 38V supply from the supply input terminal 110 to a 12V at 0.2 A supply to the PLC 135.

The PLC 135 is coupled to the first bias regulator 130. The PLC 135 may be configured to interface with the components of the power delivery system 100, such that the PLC 135 may enable or disable components based on monitored conditions. For example, the PLC 135 may be coupled to the IBB converter 105 to implement a switching method to generate a power supply of a determined value for the power amplifier 115.

The second bias regulator 140 is coupled between the supply input terminal 110 and the GPS 145. The second bias regulator 140 is configured as a step-down converter, such that a magnitude of an input voltage is greater than a magnitude of an output voltage. For example, the second bias regulator 140 steps down a 38V supply from the supply input terminal 110 to a 17V at 0.2 A supply to the GPS 145.

The GPS 145 is coupled to the second bias regulator 140. The GPS 145 is configured to determine the geographical location of the device, such that transmission distances may be approximately determined. The GPS 145 may be configured to interface with the PLC 135, such that the PLC 135 may control and read the GPS 145. For example, the PLC 135 may be coupled to the GPS 145 to determine the distance the power amplifier output 115A may transmit a signal from the power amplifier controller 125.

In example operation, a power supply of a first voltage magnitude is coupled to the supply input terminal 110. The IBB converter 105 converts the first voltage magnitude to a second voltage magnitude. The IBB converter 105 is configured to supply power of the second voltage magnitude to the power amplifier 115. The power amplifier 115 is configured to generate an output on the power amplifier output terminal 115A of the power amplifier 115 based on the power amplifier controller 125.

In example operation, the buck converter 120 steps-down the first voltage magnitude to a third voltage magnitude. The buck converter 120 is configured to supply power of the third magnitude to the power amplifier controller 125, such that the power amplifier controller 125 may control the power amplifier 115. The power amplifier controller 125 is configured to control the power amplifier 115, such that the power amplifier output terminal 115A is an amplified version of a digital or analog signal from the power amplifier controller 125.

In example operation, the first bias regulator 130 steps-down the first voltage magnitude to a fourth voltage magnitude. The first bias regulator 130 is configured to supply power of the fourth voltage magnitude to the PLC 135. The PLC 135 is configured to control and monitor the components of the power delivery system 100. The second bias regulator 140 steps-down the first voltage magnitude to a fifth voltage magnitude. The second bias regulator 140 is configured to supply power of the fifth voltage magnitude to the GPS 145. The GPS 145 is configured to determine the geographical location of the power delivery system 100. Advantageously, the power delivery system 100 is configured to operate from a single power supply coupled to the supply input terminal 110.

Figure 2:
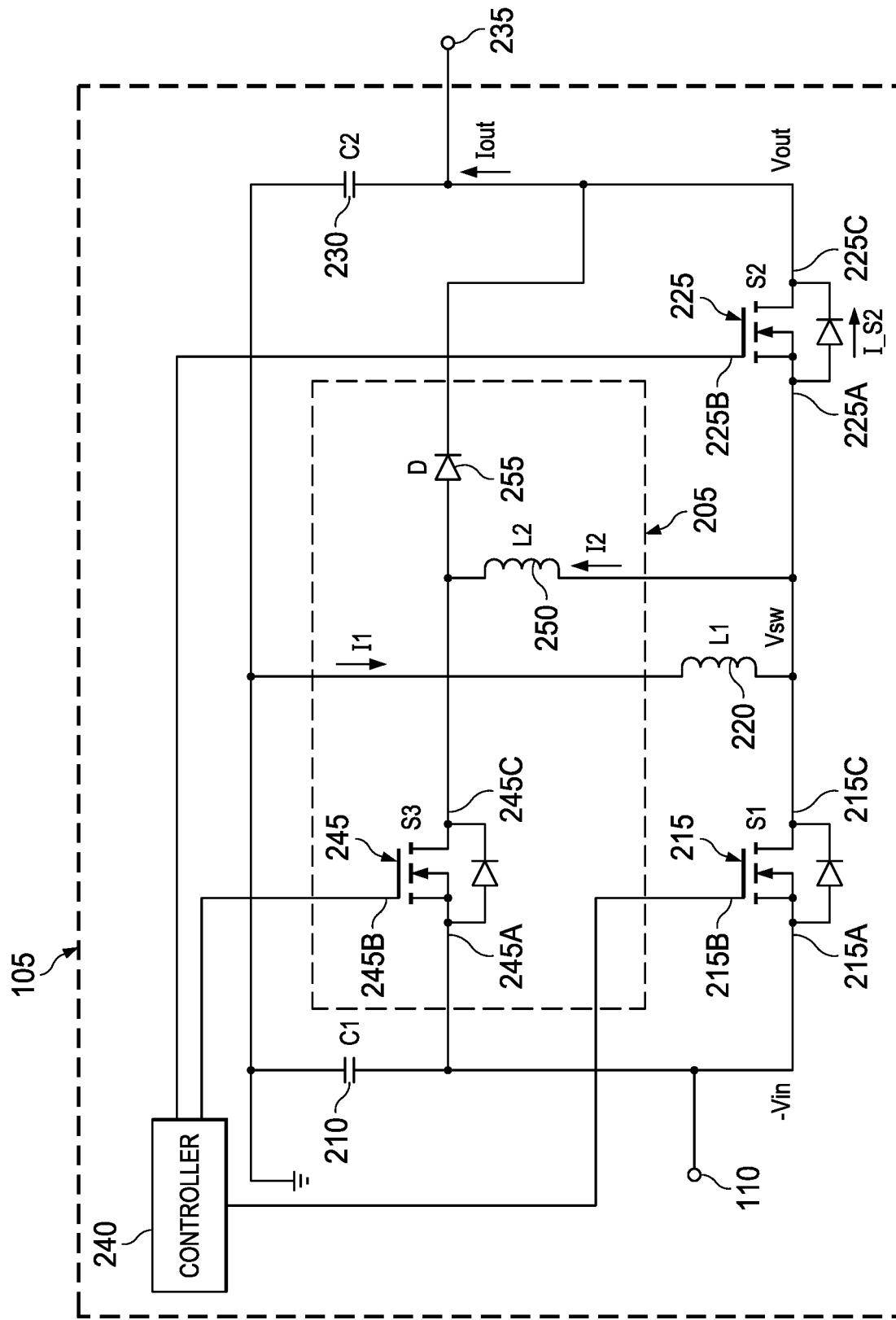
FIG. 2 is a schematic diagram of the IBB converter of FIG. 1 including an auxiliary circuit.

FIG. 2 is a schematic diagram of the IBB converter 105 of FIG. 1 including an auxiliary circuit 205. In the example of FIG. 2, the IBB converter 105 includes the supply input terminal 110, the auxiliary circuit 205, an example first capacitor 210, an example first transistor 215, an example first inductor 220, a second transistor 225, a second capacitor 230, an example supply output terminal 235, and an example controller 240. The IBB converter 105 is configured to supply power to the supply output terminal 235 as a result of a power supply being coupled to the supply input terminal 110.

The auxiliary circuit 205 includes a third transistor 245, a second inductor 250, and an example diode 255. The auxiliary circuit 205 is configured to transfer power stored in an output capacitance of the first transistor 215 and a forward biased body diode (illustrated as a diode) of the second transistor 225 to the second inductor 250 as a result of enabling the third transistor 245. The auxiliary circuit 205 is configured to approximately (preferably exactly) completely discharge the body diode of the second transistor 225 before superimposing a reverse bias on the body diode of the second transistor 225 to charge the first inductor 220. The auxiliary circuit 205 is configured to transfer power stored in the second inductor 250 to the supply output terminal 235, such that the supply output terminal 235 is coupled to the auxiliary output of the auxiliary circuit 205. Advantageously, a current spike on the supply output terminal 235 is reduced as a result of the auxiliary circuit 205 approximately completely discharging the body diode of the second transistor 225 before a reverse bias may be superimposed across the second transistor 225. Advantageously, the power efficiency of the IBB converter is increased as a result of the auxiliary circuit 205 storing the power transferred from the body diode of the second transistor 225.

In the example of FIG. 2, the first capacitor 210 is coupled between the supply input terminal 110 and common potential (e.g., ground). The first capacitor 210 is configured to isolate the current through the first transistor 215 from common potential, such that the current from the supply input terminal 110 has to flow through the first inductor 220. Advantageously, the first capacitor 210 isolates the current supplied by the supply input terminal 110 from common potential.

A first current terminal 215A of the first transistor 215 is coupled to the supply input terminal 110 and the first capacitor 210. A drain terminal and/or a source terminal may be referred to as a current terminal. A control terminal 215B of the first transistor 215 is coupled to a control output of the controller 240. A gate terminal may be referred to as a control terminal or a control input. A second current terminal 215C of the first transistor 215 is coupled to the first inductor 220 and a first current terminal 225A of the second transistor 225. The first transistor 215 is configured to be controlled by the controller 240. The first transistor 215 has a body diode, which is not a physical discrete component, but a representation of the behavior of the first transistor 215 as a result of being enabled. The first transistor 215 is configured to enable current to flow from the supply input terminal 110 to the first inductor 220 as a result of being enabled. The first transistor 215 includes an output capacitance as a result of a voltage applied to the second current terminal 215C of the first transistor 215 while the first transistor 215 is disabled. The first transistor 215 is a n-channel field effect transistor (NFET). Alternatively, the first transistor 215 may be implemented using a diode (e.g., with a reference voltage), an p-channel field-effect transistor (PFET), an n-channel insulated-gate bipolar transistor (IGBT), an n-channel junction field effect transistor (JFET), an NPN bipolar junction transistor (BJT) and/or, with slight modifications, a p-type equivalent device.

The first inductor 220 is coupled between the second current terminal 215C of the first transistor 215 and common potential. The first inductor 220 is configured to charge as a result of being supplied current from the first transistor 215, such that the first inductor 220 charges. The first inductor 220 is configured to discharge as a result of the disabling the first transistor 215 and enabling the second transistor 225, such that current is being supplied by the first inductor 220 to the second transistor 225. A magnitude of the first inductor 220 is determined based on the second inductor 250, such that a current flowing through the second inductor 250 is greater than the current flowing through the first inductor 220. Advantageously, the first inductor 220 may be charged by enabling the first transistor 215 and disabling the second transistor 225.

The first current terminal 225A of the second transistor 225 is coupled to the second current terminal 215C of the first transistor 215 and the first inductor 220. A control terminal 225B of the second transistor 225 is coupled to a control output of the controller 240. A second current terminal 225C of the second transistor 225 is coupled to the second capacitor 230 and the supply output terminal 235. The second transistor 225 includes a body diode (illustrated as a diode), which is not a physical discrete component, but a representation of the behavior of the second transistor 225. The second transistor 225 couples the first inductor 220 to the supply output terminal 235 as a result of the controller 240 enabling the second transistor 225 and disabling the first transistor 215. The second transistor 225 may be referred to as a freewheeling FET. A freewheeling FET is a transistor which provides a continuous conduction path (e.g., an electrical trace, an electrical short, a wire bond, etc.) to allow current to flow through the transistor from an inductor. For example, the second transistor 225 is configured to allow the first inductor 220 to supply current to the supply output terminal 235 as a result of the continuous conduction path being enabled by the second transistor 225. The second transistor 225 is a NFET. Alternatively, the second transistor 225 may be an PFET, an n-channel IGBT, an n-channel JFET, an NPN BJT and/or, with slight modifications, a p-type equivalent device.

The second capacitor 230 is coupled between the supply output terminal 235 and common potential (e.g., ground). The second capacitor 230 isolates the current through the second transistor 225 from common potential, such that a current supplied by the first inductor 220 may be approximately equal to a current supplied to the supply output terminal 235. Advantageously, the second capacitor 230 isolates the current supplied to the supply output terminal 235 from common potential.

A first current terminal 245A of the third transistor 245 is coupled to the supply input terminal 110, the first capacitor 210, and the first current terminal 215A. A control terminal 245B of the third transistor 245 is coupled to a control output of the controller 240. A second current terminal 245C of the third transistor 245 is coupled to the second inductor 250 and the diode 255. The third transistor 245 has a body diode, which is not a physical discrete component, but a representation of the behavior of the third transistor 245 as a result of being enabled. The third transistor 245 is configured to be controlled by the controller 240. The third transistor 245 transfers energy stored in the body diode of the second transistor 225 and the output capacitance of the first transistor 215 to the second inductor 250 as a result of being enabled. The third transistor 245 is a NFET. Alternatively, the third transistor 245 may be an PFET, an n-channel IGBT, an n-channel JFET, an NPN BJT and/or, with slight modifications, a p-type equivalent device.

The second inductor 250 is coupled between the second current terminal 215C of the first transistor 215 and the second current terminal 245C of the third transistor 245. The second inductor 250 charges based on the output capacitance of the first transistor 215 and the body diode of the second transistor 225 as a result of the controller 240 enabling the third transistor 245. Additionally, the second inductor 250 discharges as a result of the controller 240 enabling the first transistor 215 and disabling the third transistor 245. For example, the second inductor 250 discharges by allowing current to flow from the second inductor 250 through the body diode of the first transistor 215 as a result of the magnitude of the first inductor 220 being greater than a magnitude of the second inductor 250; the first transistor 215 being enabled; and the second transistor 225 being disabled. Advantageously, the first transistor 215 is able to achieve zero-voltage switching (ZVS) as a result of the current flowing through the body diode of the first transistor 215 from the second inductor 250.

The diode 255 is coupled between the supply output terminal 235 and the second inductor 250. The diode 255 allows current to flow from the third transistor 245 or the second inductor 250 to the supply output terminal 235. Alternatively, the diode 255 may be referred to as a flyback diode. A flyback diode is a diode connected in parallel to an inductor, such that the diode 255 may resist sudden changes in voltage in the second inductor 250. Advantageously, the diode 255 prevents current from flowing from second capacitor 230 or the supply output terminal 235 to the second inductor 250. Advantageously, the diode 255 reduces the current spike at the supply output terminal 235.

In example operation, the IBB converter 105 is configured to convert the voltage of the supply input terminal 110 to an output voltage on the supply output terminal 235 based on the duty cycle generated by the controller 240. For example, the IBB converter 105 may step-down the voltage of the supply input terminal 110 as a result of the controller 240 applying a pulse width modulated (PWM) signal to the control terminals 215B and 225B with a duty cycle less than approximately 50 percent. Alternatively, the IBB converter 105 may be configured to step-up the voltage of the supply input terminal 110 as a result of the controller 240 applying a PWM signal to the control terminals 215B and 225B with a duty cycle greater than approximately 50 percent. Advantageously, the IBB converter 105 may step-up or step-down the voltage applied to the supply input terminal 110 based on a method implemented to control the transistors 215 and 225.

In example operation, the IBB converter 105 is configured to reduce current spikes on the supply output terminal 235 by enabling the third transistor 245, such that the energy stored in the output capacitance (not illustrated) of the first transistor 215 and the body diode of the second transistor 225 is transferred to the second inductor 250. The controller 240 is configured to allow the body diode of the second transistor 225 to be approximately discharged, such that a current spike is prevented on the supply output terminal 235. Advantageously, the auxiliary circuit 205 reduces the current spike on the supply output terminal 235 by transferring the energy, which would conventionally generate the current ripple to the second inductor 250. The controller 240 is configured to transfer the energy stored in the second inductor 250 through the diode 255 to the second capacitor 230, such that the supply output terminal 235 is supplied by the energy stored in the second inductor 250. Advantageously, the power efficiency of the IBB converter 105 is increased as a result of the energy stored in the output capacitance (not illustrated) of the first transistor 215 and the body diode of the second transistor 225 being supplied to the supply output terminal 235 by the auxiliary circuit 205.

In example operation, the IBB converter 105 may be configured to operate in a plurality of different stages of operation to achieve CCM operation of the IBB converter 105. A stage of operation is a state of the IBB converter 105 in which the controller 240 enables and/or disables the transistors 215, 225, and 245 to alter the operations of the IBB converter 105. For example, a first stage may be considered the stage that the controller 240 has disabled the transistors 215 and 245 and enabled the second transistor 225. The controller 240 may be configured to generate the desired output on the supply output terminal 235 based on switching the transistors 215, 225, and 245 to transition from the operation of one stage to another. The IBB converter 105 may be controlled by the controller 240, such that any of the possible stages of operation may be active. Alternatively, some of the possible stages of operation may only be the result of following another stage. Advantageously, the controller 240 may modify the operation of the IBB converter 105 by altering the order and/or duration of each stage of operation.

Figure 3:
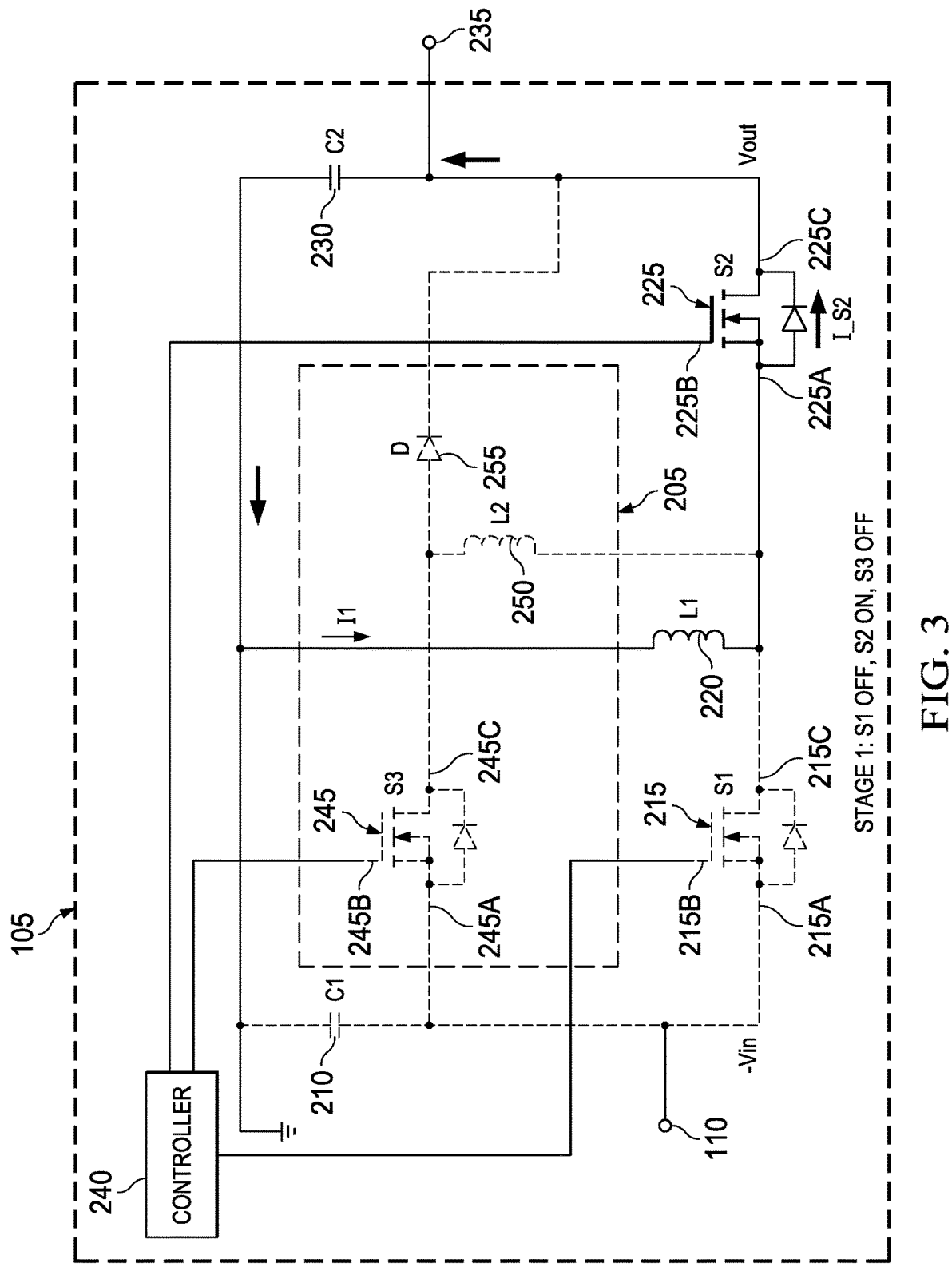
FIG. 3 is a schematic diagram of an example first stage of the IBB converter of FIGS. 1 and 2.

FIG. 3 is a schematic diagram of an example first stage of the IBB converter 105 of FIGS. 1 and 2. The IBB converter 105 of FIG. 3 includes the components of the IBB converter 105 of FIG. 2 (e.g., the transistors 215, 225, and 245, the inductors 220 and 250, and the capacitors 210 and 230) coupled in a similar manner as in FIG. 2 unless otherwise stated.

In the example of FIG. 3, the IBB converter 105 is configured for the first stage of operation. The stage of operation is controlled by the controller 240, such that each possible stage of the transistors 215, 225, and 245 generate the states of the IBB converter 105. The first stage operation includes the controller 240 disabling the transistors 215 and 245, and enabling the second transistor 225, such that current may flow from the first inductor 220 through the second transistor 225 to the second capacitor 230. In the first stage of operation, the body diode (illustrated as a diode for illustrative and understanding purposes) of the second transistor 225 is forward biased, such that the current supplied by the first inductor 220 may traverse a continuous conduction path to the supply output terminal 235.

The first stage includes the operations of the first inductor 220, the second transistor 225, the second capacitor 230, and the supply output terminal 235. In the example of the first stage, the IBB converter 105 is configured to charge the second capacitor 230 using the energy stored in the first inductor 220. Advantageously, the diode 255 of the auxiliary circuit 205 is reverse biased, such that the energy transferred through the second transistor 225 is only transferred to the second capacitor 230 and the supply output terminal 235.

Figure 4:
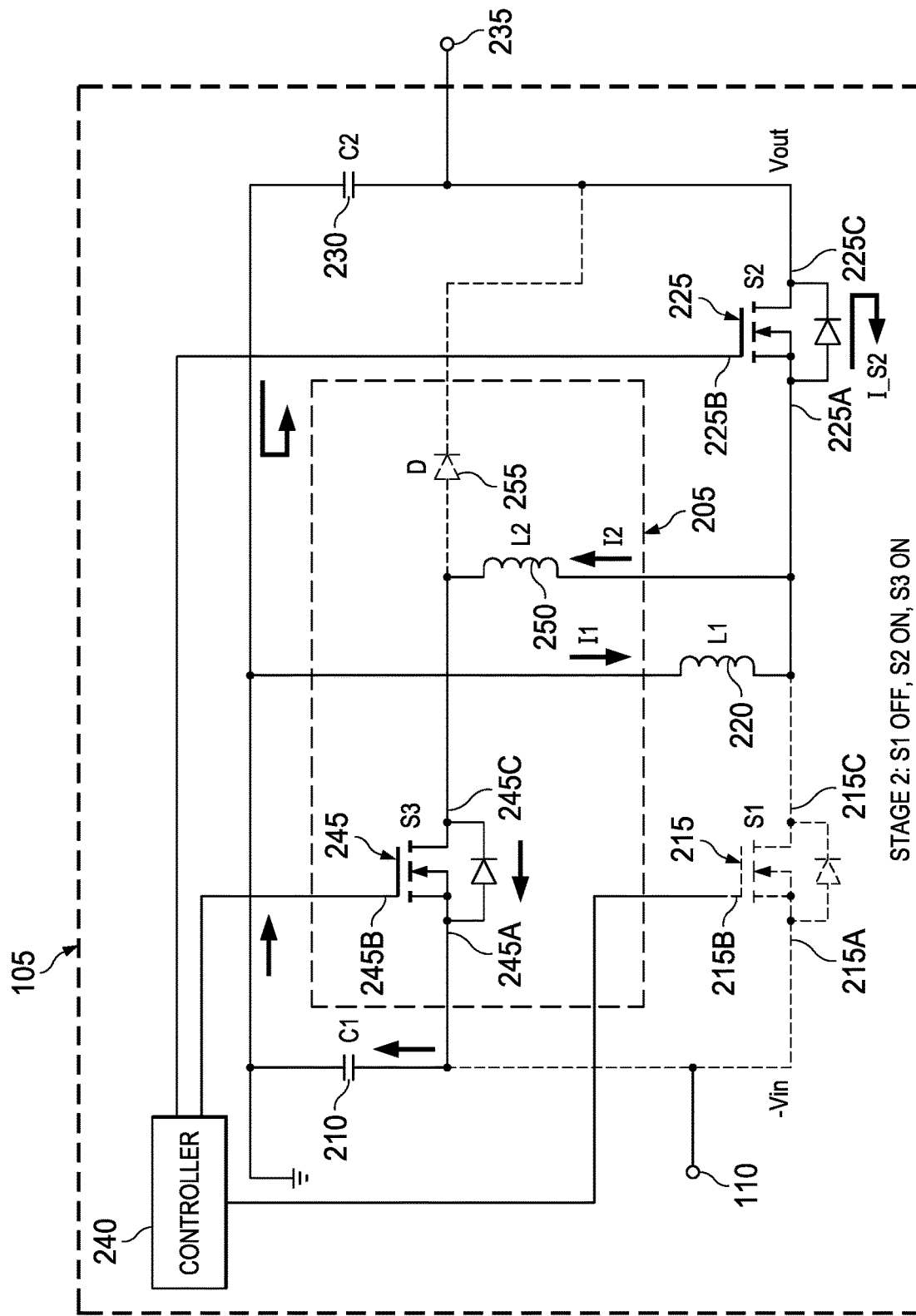
FIG. 4 is a schematic diagram of an example second stage of the IBB converter of FIGS. 1 and 2.

FIG. 4 is a schematic diagram of an example second stage of the IBB converter 105 of FIGS. 1 and 2. The IBB converter 105 of FIG. 4 includes the components of the IBB converter 105 of FIG. 2 (e.g., the transistors 215, 225, and 245, the inductors 220 and 250, and the capacitors 210 and 230) coupled in a similar manner as in FIG. 2 unless otherwise stated.

In the example of FIG. 4, the IBB converter 105 is configured for the second stage of operation. The second stage of operation includes the controller 240 of FIG. 2 disabling the first transistor 215 and enabling the transistors 225 and 245. The second stage is configured for the controller 240 to enable the third transistor 245, such that energy stored in the body diode of the second transistor 225 is transferred to the second inductor 250. The energy transferred to the second inductor 250 includes a current from the body diode of the second transistor 225.

The second stage of operation is configured to charge the second inductor 250 until the current from the body diode of the second transistor 225 is approximately equal to 0 amps (A). The energy transferred to second inductor 250 may be transferred to the first capacitor 210 through the third transistor 245 as a result of the controller 240 enabling the first transistor 215, such that a reverse voltage is applied to the body diode of the second transistor 225 by the first transistor 215. Advantageously, a current spike on the supply output terminal 235 is reduced as a result of the second transistor 225 being discharged to approximately 0 amps (A). Advantageously, the current supplied by the body diode of the second transistor 225 is stored in second inductor 250, such that a spike generated by a reverse recovery is reduced.

The second stage includes the first capacitor 210, the first inductor 220, the second transistor 225, the second capacitor 230, and the supply output terminal 235. In the example of the second stage, the IBB converter 105 is configured to charge the second inductor 250 using the energy stored in the body diode of the second transistor 225 as a result of the controller 240 disabling the first transistor 215 and enabling the third transistor 245. Advantageously, the energy stored in the body diode of the second transistor 225 from the first stage is transferred to the second inductor 250. Advantageously, the current spike on the supply output terminal 235, caused by the energy stored in the body diode of the second transistor 225, is reduced.

Figure 5:
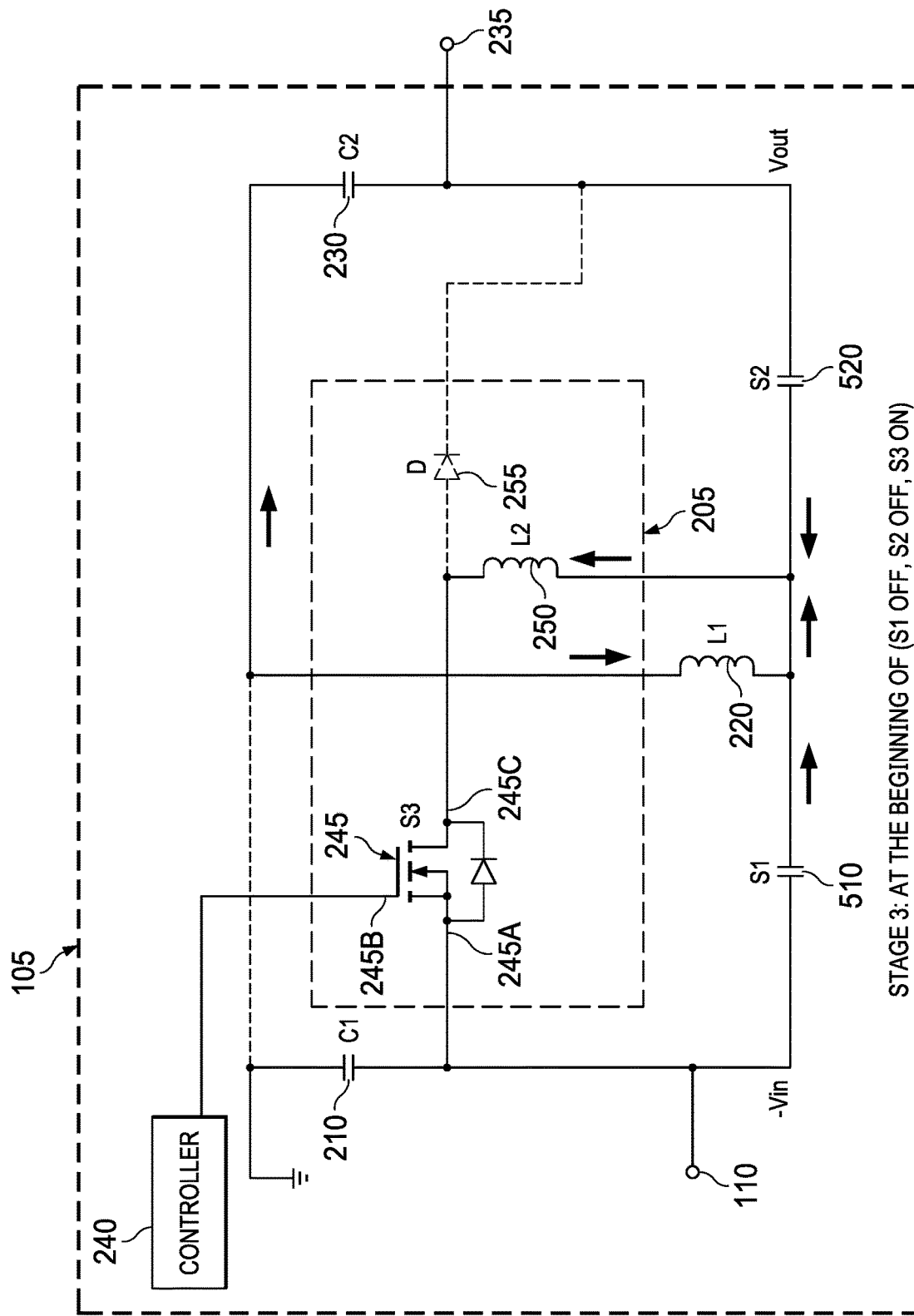
FIG. 5 is a schematic diagram of an example third stage of the IBB converter of FIGS. 1 and 2.

FIG. 5 is a schematic diagram of an example third stage of the IBB converter 105 of FIGS. 1 and 2. The IBB converter 105 of FIG. 5 includes the first capacitor 210, the first inductor 220, the second capacitor 230, the supply output terminal 235, the third transistor 245, the second inductor 250, the diode 255, a third capacitor 510, and a fourth capacitor 520. The IBB converter 105 of FIG. 5 includes the components of the IBB converter 105 of FIG. 2 (e.g., the transistors 215, 225, and 245, the inductors 220 and 250, and the capacitors 210 and 230) coupled in a similar manner as in FIG. 2 unless otherwise stated. The capacitors 510 and 520 are representative of an output capacitance of the transistors 215 and 225 of FIG. 2, such that the capacitors 510 and 520 are for illustrative and understanding purposes.

In the example of FIG. 5, the IBB converter 105 is configured for the third stage of operation. The third stage of operation includes the controller 240 of FIG. 2 disabling the transistors 215 and 225 and enabling the third transistor 245. The third stage is a duration in time immediately following the second stage and the controller 240 disabling the transistors 215 and 225, such that during the duration of the third stage the output capacitance of the transistors 215 and 225 are being discharged into the second inductor 250. Alternatively, during the third stage the transistors 215 and 225 may be represented by the capacitors 510 and 520, such that the capacitors are discharging during the duration of the third stage.

In the example of the third stage, the IBB converter 105 is configured to charge the second inductor 250 using the energy stored in the output capacitance of the first transistor 215 (illustrated as the third capacitor 510) and second transistor 225 (illustrated as the fourth capacitor 520) as a result of the controller 240 disabling the transistors 215 and 225 and enabling the third transistor 245. Advantageously, the energy stored in the output capacitance of the transistors 215 and 225 from the first and second stage is transferred to the second inductor 250. Advantageously, the current spike on the supply output terminal 235, caused by the energy stored in the output capacitance of the transistors 215 and 225, is reduced.

Figure 6:
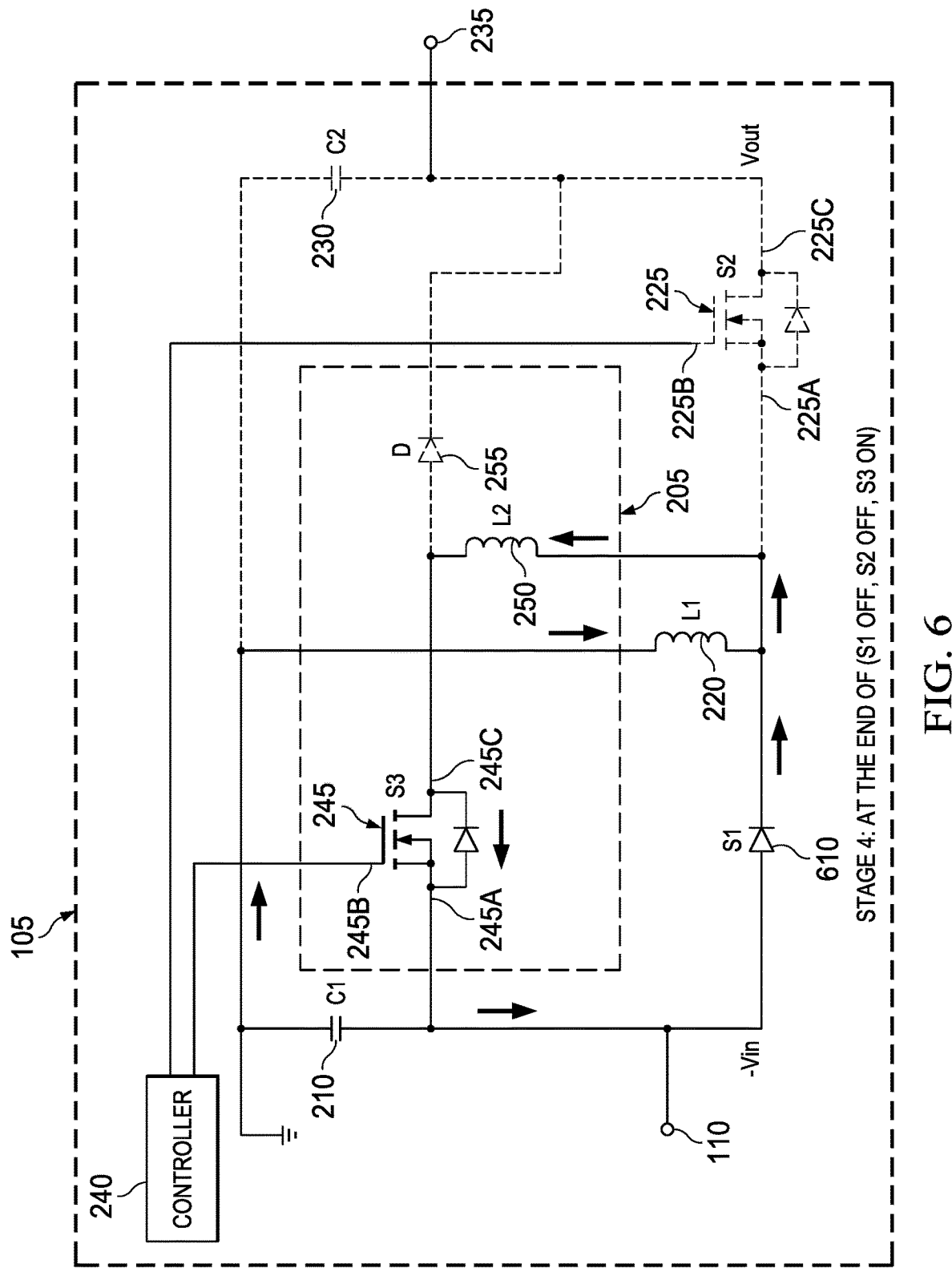
FIG. 6 is a schematic diagram of an example fourth stage of the IBB converter of FIGS. 1 and 2.

FIG. 6 is a schematic diagram of an example fourth stage of the IBB converter 105 of FIGS. 1 and 2. The IBB converter 105 of FIG. 5 includes the first capacitor 210, the first inductor 220, the second transistor 225, the second capacitor 230, the supply output terminal 235, the third transistor 245, the second inductor 250, an example first diode 255, and a second diode 610. The IBB converter 105 of FIG. 5 includes the components of the IBB converter 105 of FIG. 2 (e.g., the transistors 215, 225, and 245, the inductors 220 and 250, and the capacitors 210 and 230) coupled in a similar manner as in FIG. 2 unless otherwise stated. The second diode 610 is representative of a body diode of the first transistor 215 of FIG. 2, such that the second diode 610 is for illustrative and understanding purposes.

In the example of FIG. 6, the IBB converter 105 is configured for the fourth stage of operation. The fourth stage of operation includes the controller 240 of FIG. 2 disabling the transistors 215 and 225 and enabling the third transistor 245. The fourth stage is a duration in time in which the first transistor 215 is being enabled by the controller 240. During the fourth stage the first transistor 215 operates as a diode and immediately following the third stage of operation, such that during the duration of the fourth stage the first transistor 215 operates as a diode. Alternatively, during the fourth stage the first transistor 215 may be represented by the second diode 610, such that the diode allows the second inductor 250 to charge during the duration of the fourth stage.

In the example of the fourth stage, the IBB converter 105 is configured to charge the second inductor 250 using the current flowing through the first transistor 215 (illustrated as the second diode 610 for clarity) and the first inductor 220. The current flowing through the second inductor 250 is the combination of the current flowing through the first inductor 220 and the second diode 610. Advantageously, the first transistor 215 achieves zero-voltage switching as a result of the body diode of the first transistor 215 allowing current to flow from the first current terminal 215A to the second current terminal 215C.

Figure 7:
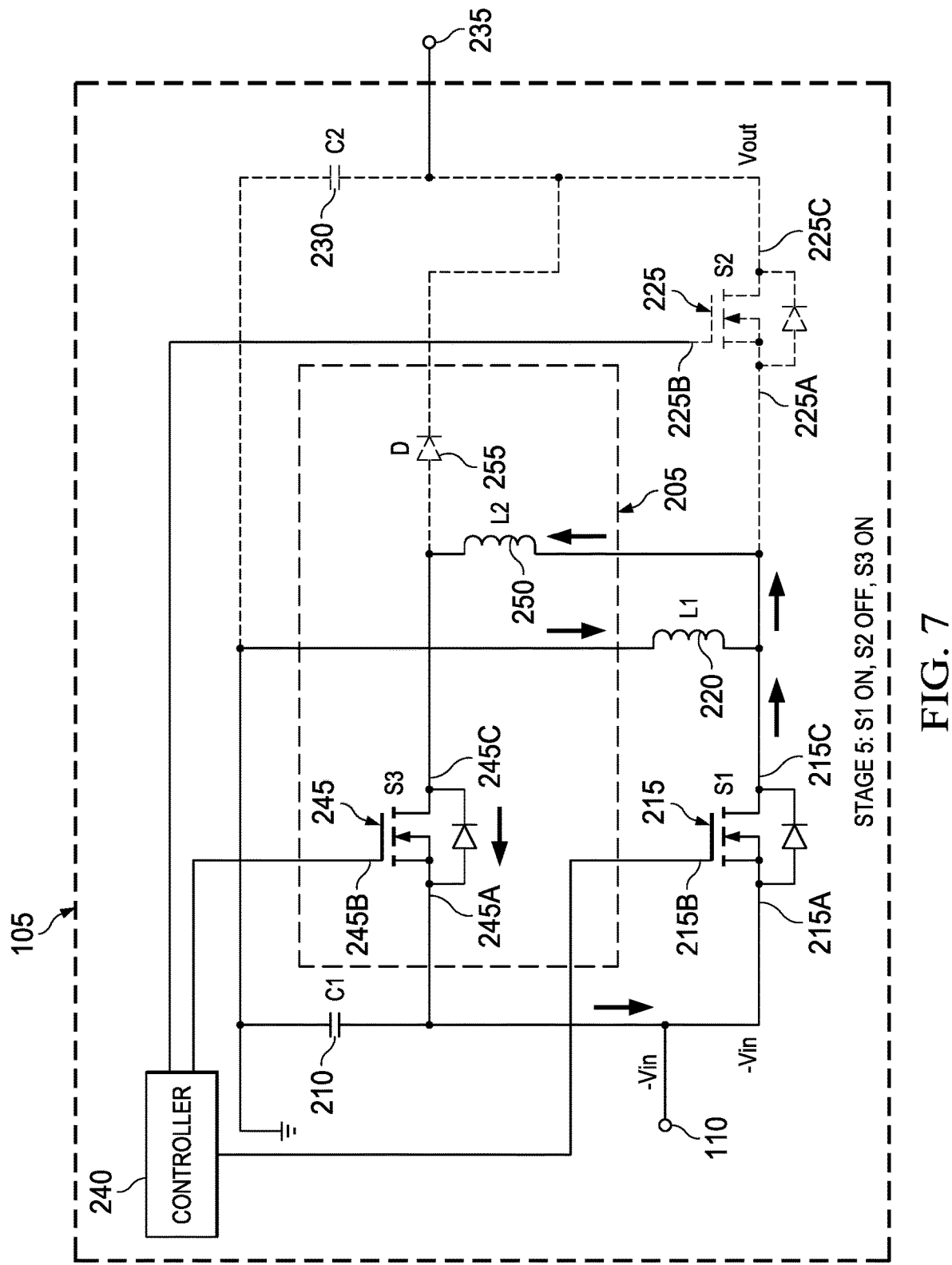
FIG. 7 is a schematic diagram of an example fifth stage of the IBB converter of FIGS. 1 and 2.

FIG. 7 is a schematic diagram of an example fifth stage of the IBB converter 105 of FIGS. 1 and 2. The IBB converter 105 of FIG. 7 includes the components of the IBB converter 105 of FIG. 2 (e.g., the transistors 215, 225, and 245, the inductors 220 and 250, and the capacitors 210 and 230) coupled in a similar manner as in FIG. 2 unless otherwise stated.

In the example of FIG. 7, the IBB converter 105 is configured for the fifth stage of operation. The fifth stage of operation includes the controller 240 of FIG. 2 enabling the transistors 215 and 245 and disabling the second transistor 225. The fifth stage occurs as a result of the controller 240 enabling the first transistor 215 following the fourth stage. During the fifth stage energy is transferred to second inductor 250 through the first transistor 215 and the first inductor 220 as a result of the controller 240 enabling the first transistor 215.

The fifth stage includes the first capacitor 210, the first transistor 215, the first inductor 220, the third transistor 245, and the second inductor 250. In the example of the fifth stage, the IBB converter 105 is configured to charge the second inductor 250 using energy transferred through the first transistor 215 and the first inductor 220.

Figure 8:
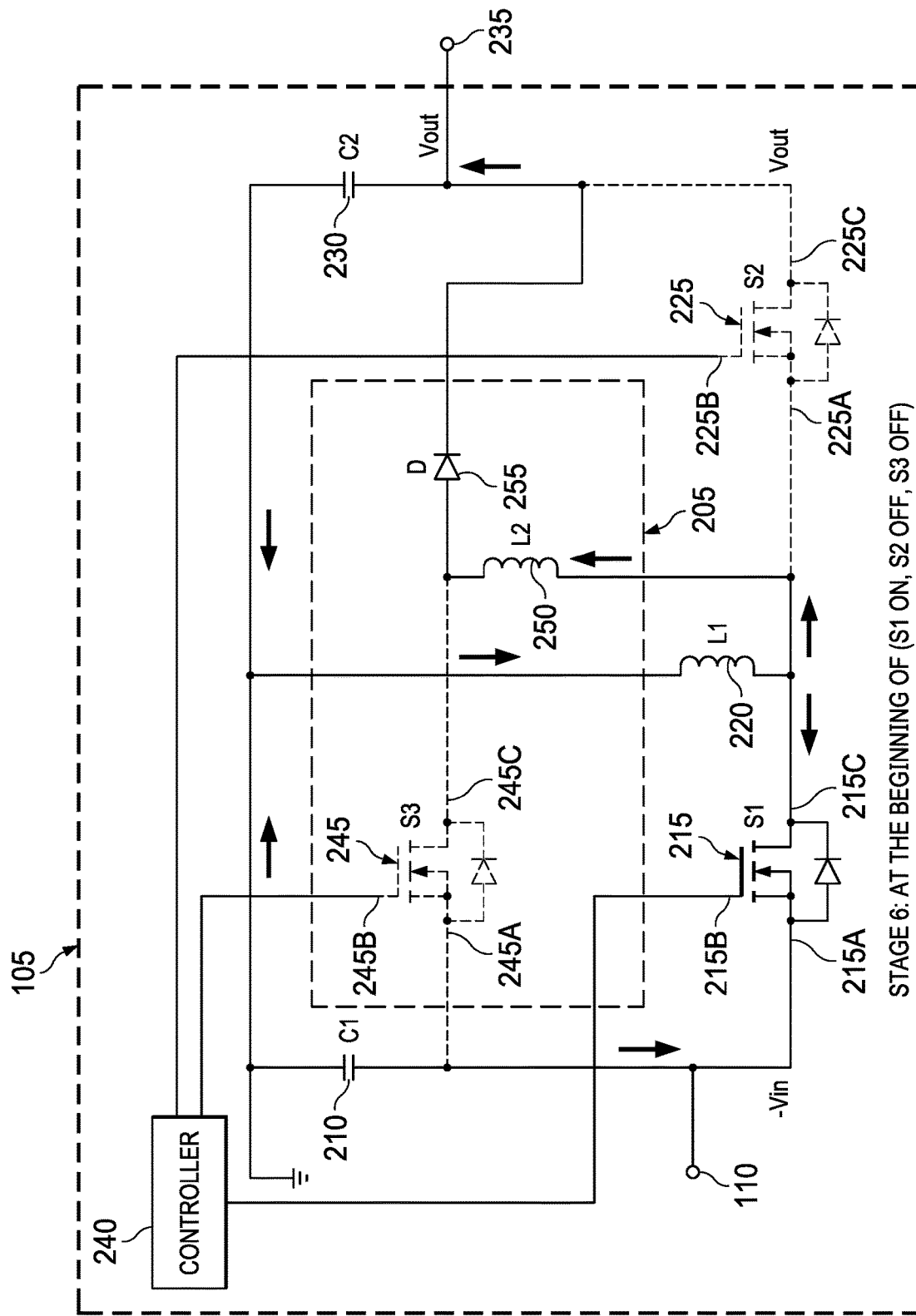
FIG. 8 is a schematic diagram of an example sixth stage of the IBB converter of FIGS. 1 and 2.

FIG. 8 is a schematic diagram of an example sixth stage of operation of the IBB converter 105 of FIGS. 1 and 2. The IBB converter 105 of FIG. 8 includes the components of the IBB converter 105 of FIG. 2 (e.g., the transistors 215, 225, and 245, the inductors 220 and 250, and the capacitors 210 and 230) coupled in a similar manner as in FIG. 2 unless otherwise stated.

In the example of FIG. 8, the IBB converter 105 is configured for the sixth stage of operation. The sixth stage of operation includes a duration in time immediately following the controller 240 of FIG. 2 enabling the first transistor 215 and disabling the transistors 225 and 245. The sixth stage is configured to charge the second capacitor 230 using energy stored in the second inductor 250 through the diode 255 as a result of the controller 240 enabling the first transistor 215 and disabling the transistors 225 and 245, such that the diode 255 is forward biased. The sixth stage of operation may be initiated following the fifth stage by disabling the third transistor 245, such that the auxiliary circuit 205 may begin to discharge. Advantageously, the energy transferred from the second inductor 250 to charge the second capacitor 230 reduces the current spike of the supply output terminal 235.

The sixth stage includes the first capacitor 210, the first transistor 215, the first inductor 220, the second capacitor 230, the second inductor 250, and the diode 255. In the example of FIG. 8, the controller 240 disables the third transistor 245, such that the energy stored in the second inductor 250 is transferred to the second capacitor 230 through the diode 255. The energy stored in the second inductor 250 is configured to a magnitude sufficient to charge the second capacitor 230, such that an output ripple caused by a discharge of the second capacitor 230 is reduced. Advantageously, the second capacitor 230 remains charged enough to prevent a current spike on the supply output terminal 235.

Figure 9:
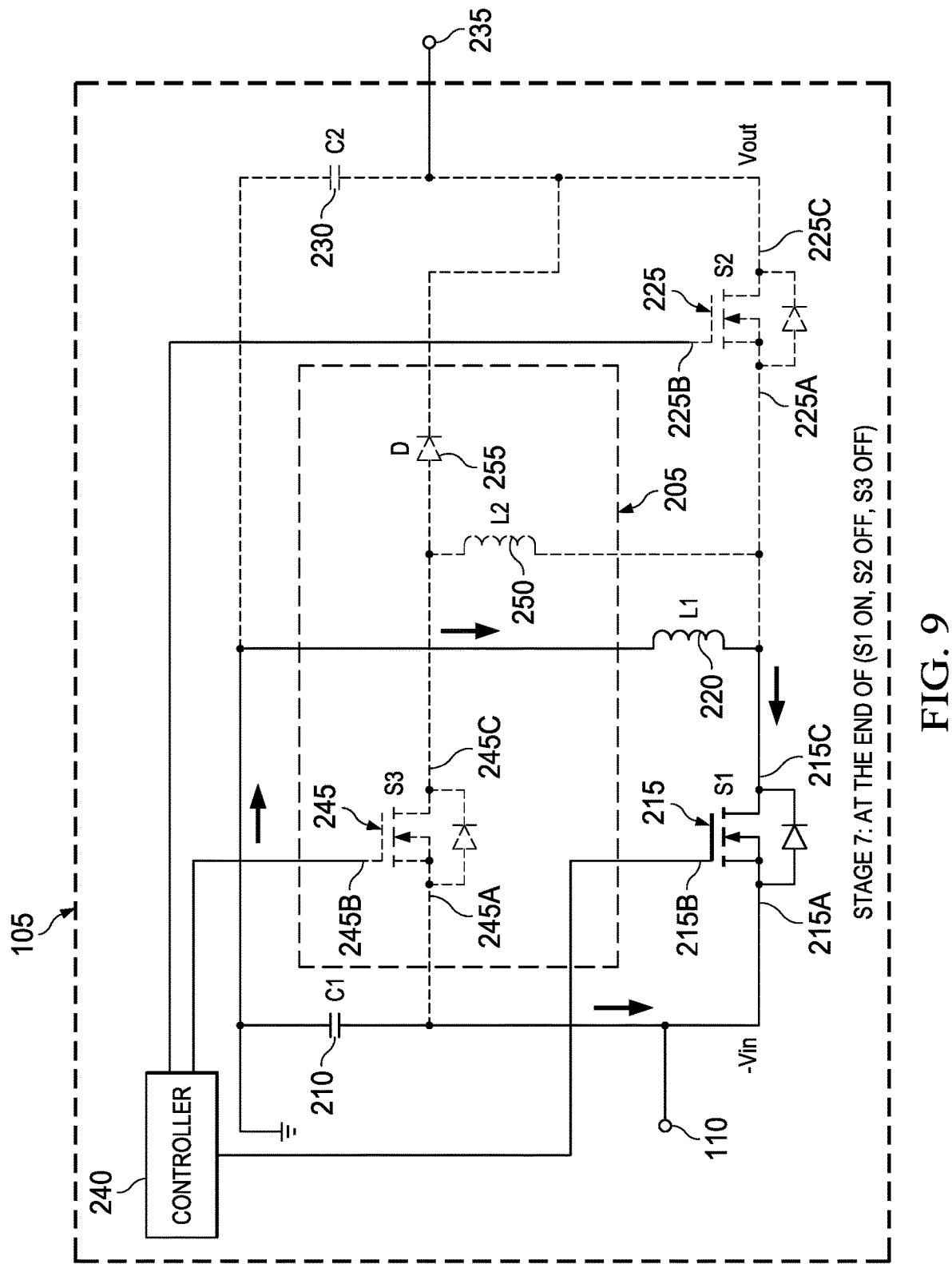
FIG. 9 is a schematic diagram of an example seventh stage of the IBB converter of FIGS. 1 and 2.

FIG. 9 is a schematic diagram of an example seventh stage of operation of the IBB converter 105 of FIGS. 1 and 2. The IBB converter 105 of FIG. 9 includes the components of the IBB converter 105 of FIG. 2 (e.g., the transistors 215, 225, and 245, the inductors 220 and 250, and the capacitors 210 and 230) coupled in a similar manner as in FIG. 2 unless otherwise stated.

In the example of FIG. 9, the IBB converter 105 is configured for the seventh stage of operation. The seventh stage of operation includes the duration of time immediately following the sixth stage of operation in which the controller 240 of FIG. 2 enables the first transistor 215 and disables the transistors 225 and 245. The seventh stage of operation immediately follows the sixth stage of operation. The seventh stage of operation is configured to be the duration of time in which the second inductor 250 is fully discharged, such that the diode 255 is no longer charging the second capacitor 230.

In the example of FIG. 9, the seventh stage of operation includes the first capacitor 210, the first transistor 215, and the first inductor 220. The first capacitor 210 is configured to discharge, such that a current is generated through the first inductor 220. The current generated by the first capacitor 210 charges the first inductor 220. Advantageously, the first inductor 220 is charged using the energy stored in the first capacitor 210.

Figure 10:
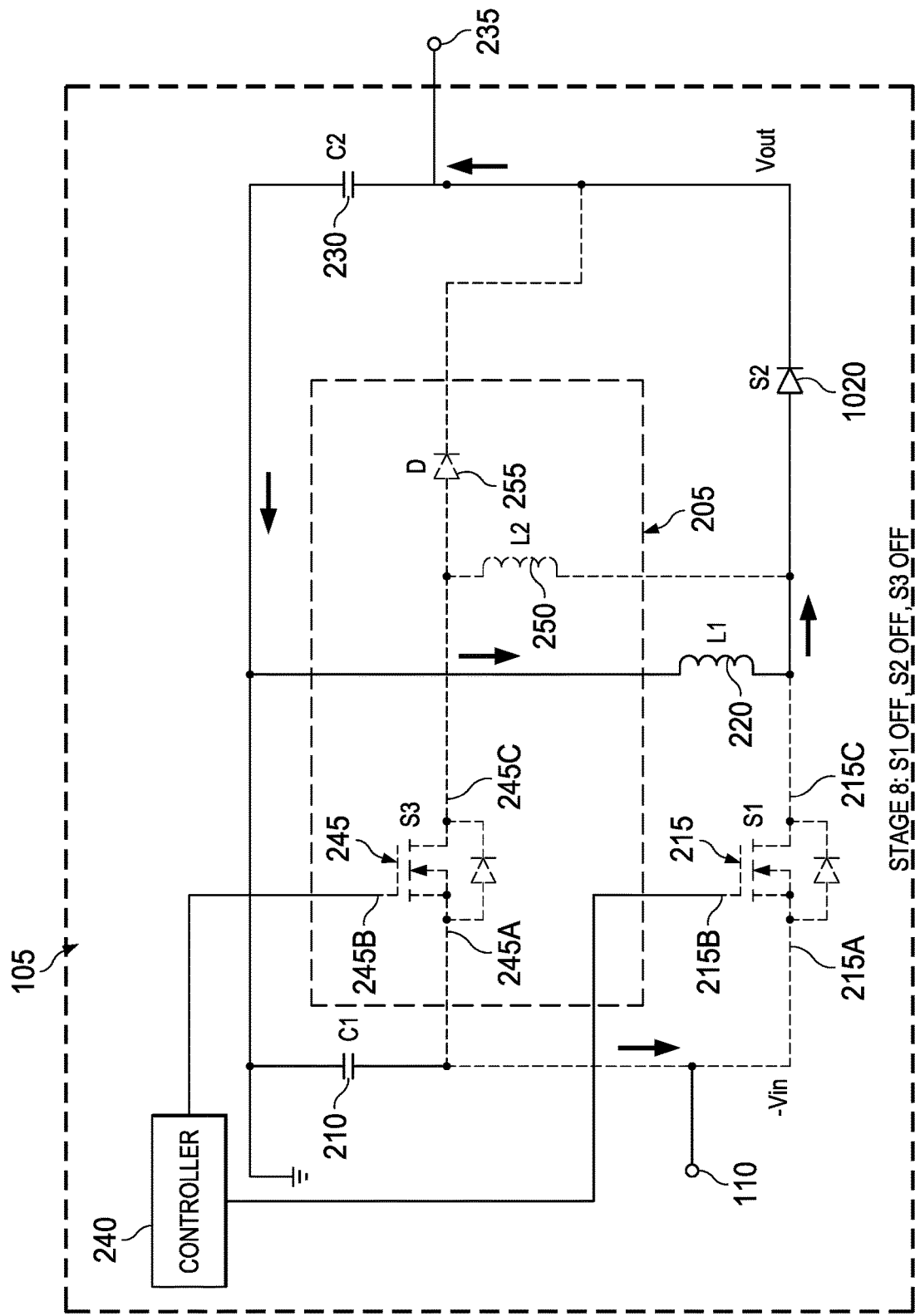
FIG. 10 is a schematic diagram of an example eighth stage of the IBB converter of FIGS. 1 and 2.

FIG. 10 is a schematic diagram of an example eighth stage of operation of the IBB converter 105 of FIGS. 1 and 2. The IBB converter 105 of FIG. 10 includes the first capacitor 210, the first transistor 215, the first inductor 220, the second capacitor 230, the supply output terminal 235, the third transistor 245, the second inductor 250, an example first diode 255, and a second diode 1020. The IBB converter 105 of FIG. 10 includes the components of the IBB converter 105 of FIG. 2 (e.g., the transistors 215, 225, and 245, the inductors 220 and 250, and the capacitors 210 and 230) coupled in a similar manner as in FIG. 2 unless otherwise stated. The second diode 1020 is representative of a body diode of the second transistor 225 of FIG. 2, such that the second diode 1020 is for illustrative and understanding purposes.

In the example of FIG. 10, the IBB converter 105 is configured for the eighth stage of operation. The eighth stage of operation includes a duration in time during which the controller 240 of FIG. 2 is enabling the second transistor 225 and the transistors 215 and 245 are disabled. The eighth stage is a duration in time in which the second transistor 225 is being enabled by the controller 240. During the eighth stage the second transistor 225 operates as a diode and immediately following the seventh stage of operation, such that during the duration of the eighth stage the second transistor 225 operates as the second diode 1020. Alternatively, during the eighth stage the second transistor 225 may be represented by the second diode 1020, such that the diode enables the second capacitor 230 to charge during the duration of the eighth stage.

In the example of FIG. 10, the seventh stage of operation includes the first inductor 220 generating a current through the second transistor 225 (illustrated as the second diode 1020) to charge the second capacitor 230. Advantageously, the energy stored in the first inductor 220 from the seventh stage of operation is transferred to the second capacitor 230, such that a current spike on the supply output terminal 235, caused by the discharge of the second capacitor 230, is reduced.

The eighth stage of operation may be proceeded by the first stage of operation of the IBB converter 105 illustrated in FIG. 3, such that the IBB converter 105 may continue to convert the voltage of the supply input terminal 110 to a voltage on the supply output terminal 235. Advantageously, the IBB converter 105 operates in continuous conduction mode by having the controller 240 transition through the stages of operation of FIGS. 1 through 10. Advantageously, the auxiliary circuit 205 is configured to transfer the energy stored in the transistors 215 and 225 to charge the second capacitor 230, such that the current spike caused by the discharge of the second capacitor 230 on the supply output terminal 235 is reduced.

Figure 11:
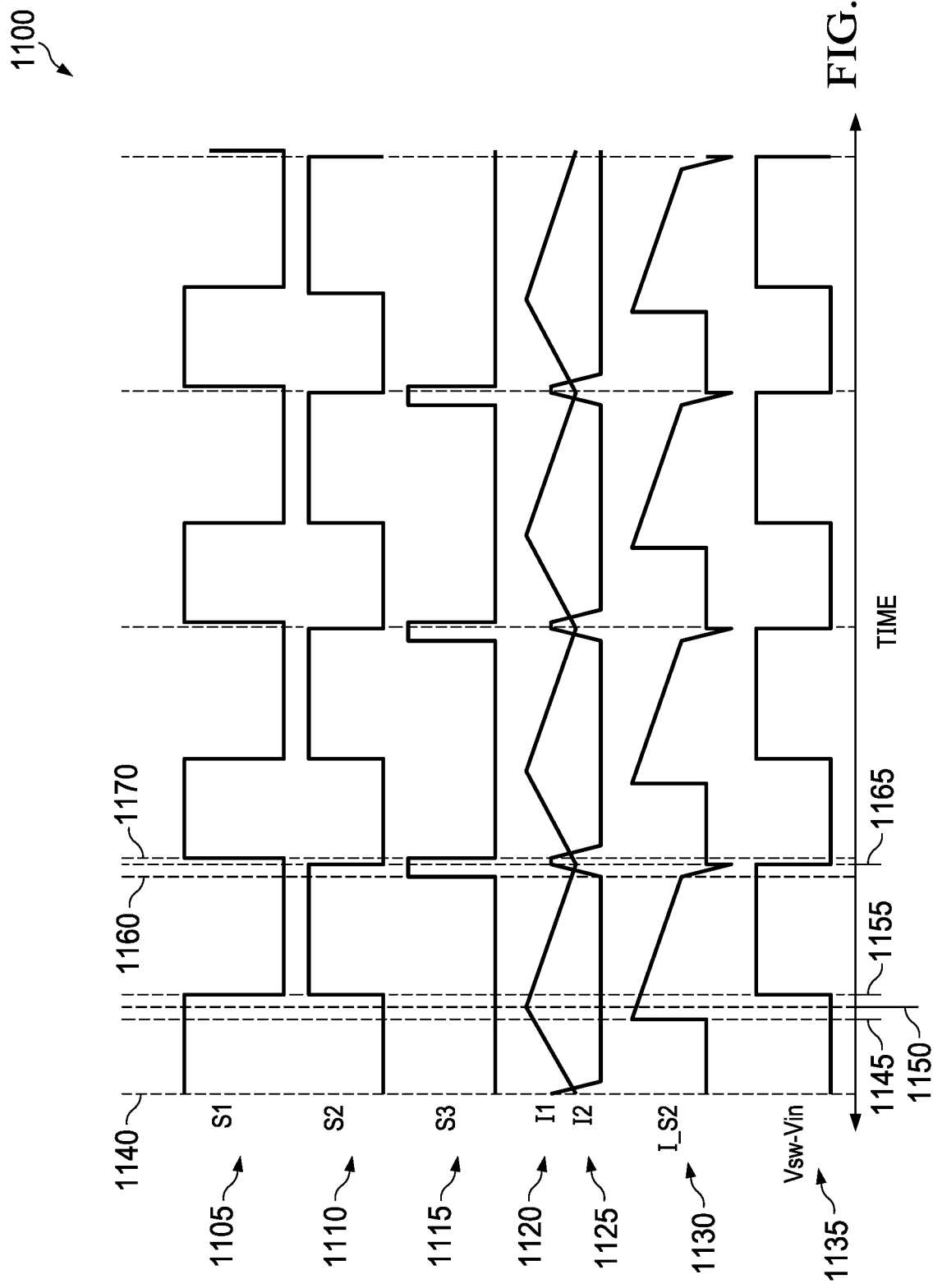
FIG. 11 is a timing diagram of a first example operation of the IBB converter of FIGS. 1 and 2.

FIG. 11 is a timing diagram 1100 of a first example operation of the IBB converter 105 of FIGS. 1-10. The timing diagram 1100 of FIG. 11 depicts example waveforms corresponding to the signals generated by the controller 240 of FIGS. 2 and 3 to control the transistors 215, 225, and 245 of FIGS. 2 and 3 as a result of the value of the first inductor 220 of FIGS. 2 and 3 divided by the value of the second inductor 250 of FIGS. 2 and 3 being greater than five hundred. Additionally, the timing diagram 1100 depicts example waveforms corresponding to the internal currents and voltages of the IBB converter 105 during example continuous conduction mode (CCM) of operation. The timing diagram 1100 includes depictions of an example first control voltage (S1) 1105, a second control voltage (S2) 1110, a third control voltage (S3) 1115, an example first inductor current (I1) 1120, a second inductor current (I2) 1125, an example switch current (I_S2) 1130, and an example output voltage ($V_{SW}$-$V_{IN}$) 1135.

In the timing diagram 1100 of FIG. 11, the first control voltage 1105 is configured to represent the voltage applied by the controller 240 to the control terminal 215B of the first transistor 215. At an example first time 1140, the controller 240 enables the first transistor 215 by setting the voltage of the first control voltage 1105, such that the first control voltage 1105 at the first time 1140 enables the first transistor 215. The second control voltage 1110 is configured to represent the voltage applied by the controller 240 to the control terminal 225B of the second transistor 225. At the first time 1140, the controller 240 disables the second transistor 225 by setting the voltage of the second control voltage 1110, such that the second control voltage 1110 at the first time 1140 disables the second transistor 225. The third control voltage 1115 is configured to represent the voltage applied by the controller 240 to the control terminal 245B of the third transistor 245. At the first time 1140, the controller 240 disables the third transistor 245 by setting the voltage of the third control voltage 1115, such that the third control voltage 1115 at the first time 1140 disables the third transistor 245.

The first inductor current 1120 is configured to represent the current flowing through the first inductor 220 of FIG. 2. The second inductor current 1125 is configured to represent the current flowing through the second inductor 250 of FIG. 2.

The switch current 1130 is configured to represent the current flowing through the body diode of the second transistor 225. At a second time 1145, the second transistors body diode allows current from the first inductor 220 to flow through the second transistor 225. The IBB converter 105 at the second time 1145 transitions from the seventh stage (illustrated by FIG. 9) to the eighth stage of operation (illustrated by FIG. 10).

At a third time 1150, the first inductor current 1120 transitions from a rising edge to a falling edge. At the third time 1150, the first inductor 220 transitions from charging to discharging, such that the current flowing through the first inductor 220 at a time immediately prior to the third time 1150 is flowing in a direction opposite to that of the current through the first inductor 220 immediately following the third time 1150. At the third time 1150, the IBB converter 105 transitions from charging the first inductor 220 to discharging the first inductor 220.

At a fourth time 1155, the controller 240 configures the control voltages 1105 and 1115 to a value that disables the transistors 215 and 245. At the fourth time 1155, the controller 240 configures the second control voltage 1110 to a value to enable the second transistor 225, such that the voltage of the first current terminal 225A is approximately the voltage of the second current terminal 225C of the second transistor 225. At the fourth time 1155, the voltage of the output voltage 1135 increases to approximately the intended value of the supply output terminal 235 of FIGS. 2 and 3. The output voltage 1135 is configured to represent the value of the voltage of the first current terminal 225A of the second transistor 225 minus the voltage of the supply input terminal 110 of FIGS. 1-3.

At a fifth time 1160, the controller 240 configures the third control voltage 1115 to a value that enables the third transistor 245. At the fifth time 1160, the second inductor current 1125 depicts the current flowing through the second inductor 250 transitioning from zero current to an increasing current. Additionally, at the fifth time 1160, the switch current 1130 begins to decrease at a rate greater than the rate of decrease during the interval between the times 1145 and 1160. Advantageously, the IBB converter 105 begins to store energy in the second inductor 250 as a result of setting the third control voltage 1115.

At a sixth time 1165, the controller 240 configures the second control voltage 1110 to a value that disables the second transistor 225. At the sixth time 1165, the first inductor current 1120 transitions from a decreasing rate to an increasing rate, such that the first inductor 220 transitions from discharging to charging. At the sixth time 1165, the second inductor current 1125 transitions from an increasing rate to a set value, such that the second inductor 250 is fully charged and remains fully charged. At the sixth time 1165, the switch current 1130 transitions from the decreasing rate to a set value, such that the current through the second transistor 225 is a set value. At the sixth time 1165, the output voltage 1135 transitions to a value approximately equal to zero volts. Advantageously, the IBB converter 105 stores the energy in the second inductor 250 despite the change in current of the switch current 1130. Advantageously, the current flowing through the second switch is approximately equal to 0 amps (A) before a negative voltage is superimposed across the second transistor 225 at a seventh time 1170.

At the seventh time 1170, the controller 240 configures the third control voltage 1115 to a value that disables the third transistor 245. At the seventh time 1170, the second inductor current 1125 is transitions from a set value to a decreasing rate, such that the second inductor 250 begins to discharge. Advantageously, the second inductor 250 begins to discharge as a result of disabling the auxiliary circuit 205 by disabling the third transistor 245.

Figure 12:
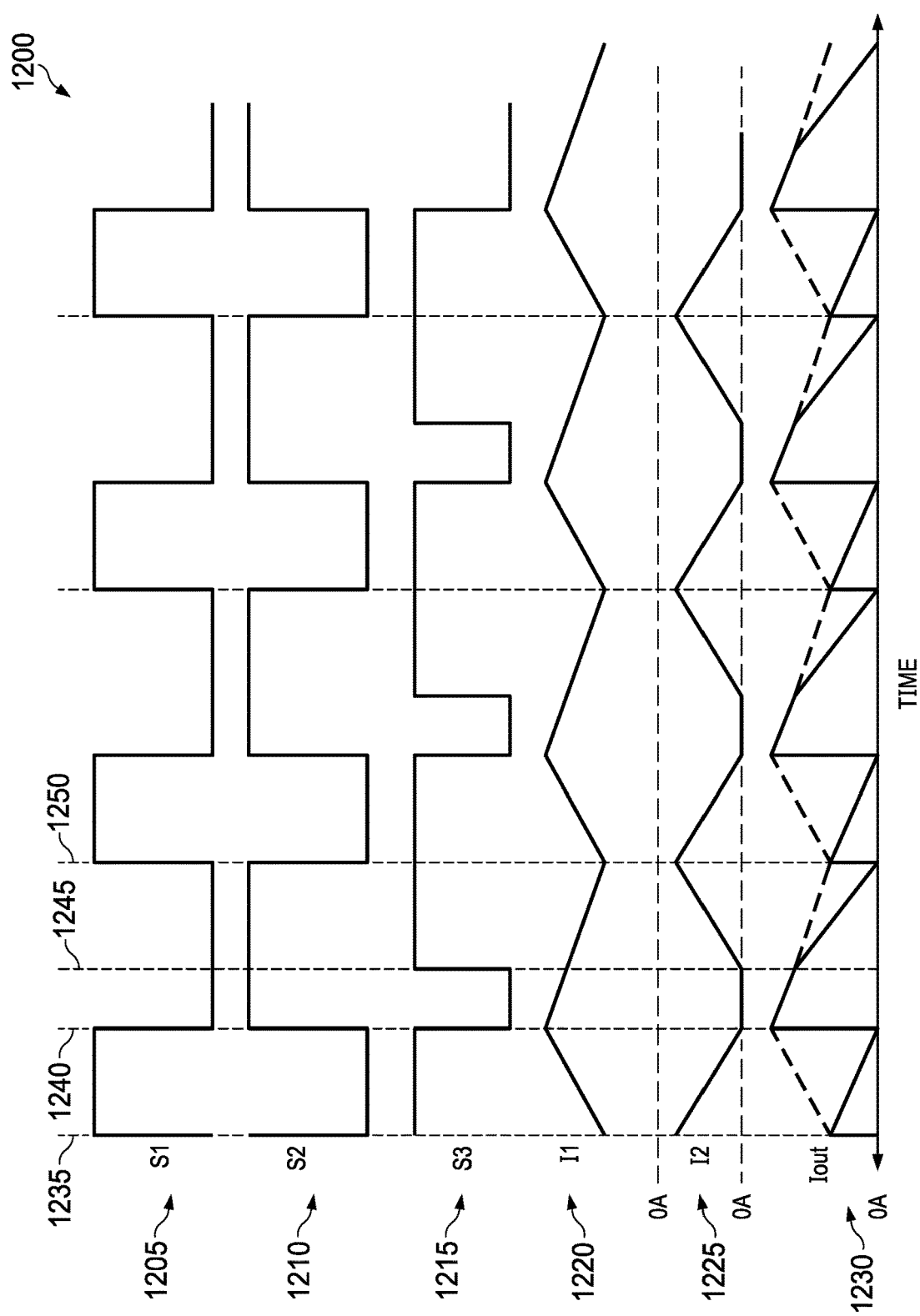
FIG. 12 is a timing diagram of a second example operation of the IBB converter of FIGS. 1 and 2.

FIG. 12 is a timing diagram 1200 of a second example operation of the IBB converter 105 of FIGS. 1 and 2. The timing diagram 1200 of FIG. 12 depicts example waveforms corresponding to the signals generated by the controller 240 of FIGS. 2 and 3 to control the transistors 215, 225, and 245 of FIGS. 2 and 3 as a result of the value of the first inductor 220 of FIGS. 2 and 3 divided by the value of the second inductor 250 of FIGS. 2 and 3 being between one and ten. Additionally, the timing diagram 1200 depicts example waveforms corresponding to the internal currents and voltages of the IBB converter 105 during example continuous conduction mode (CCM) of operation as a result of the value of the first inductor 220 of FIGS. 2 and 3 divided by the value of the second inductor 250 of FIGS. 2 and 3 being between one and ten. The timing diagram 1200 includes depictions of an example first control voltage (S1) 1205, a second control voltage (S2) 1210, a third control voltage (S3) 1215, an example first inductor current (I1) 1220, a second inductor current (I2) 1225, and an example output current ($I_{out}$) 1230.

In the timing diagram 1200 of FIG. 12, the first control voltage 1205 is configured to represent the voltage applied by the controller 240 to the control terminal 215B of the first transistor 215. At an example first time 1235, the controller 240 enables the first transistor 215 by setting the voltage of the first control voltage 1205, such that the first control voltage 1205 at the first time 1235 enables the first transistor 215. The second control voltage 1210 is configured to represent the voltage applied by the controller 240 to the control terminal 225B of the second transistor 225. At the first time 1235, the controller 240 disables the second transistor 225 by setting the voltage of the second control voltage 1210, such that the second control voltage 1210 at the first time 1235 disables the second transistor 225. The third control voltage 1115 is configured to represent the voltage applied by the controller 240 to the control terminal 245B of the third transistor 245. At the first time 1235, the controller 240 enables the third transistor 245 by setting the voltage of the third control voltage 1215, such that the third control voltage 1215 at the first time 1235 enables the third transistor 245.

The first inductor current 1220 is configured to represent the current flowing through the first inductor 220 of FIG. 2. At the first time 1235, the first inductor current 1220 begins to increase, such that the current flowing through the first inductor 220 is charging. The second inductor current 1225 is configured to represent the current flowing through the second inductor 250 of FIG. 2. At the first time 1235, the second inductor current 1225 beings to decrease, such that the second inductor 250 is begins to discharge at the first time 1235.

The output current 1230 is configured to represent the current supplied to the supply output terminal 235 of FIGS. 2-10 by the combination of currents from the second transistor 225 and the diode 255. At the first time 1235, the output current 1230 begins to decrease, such that as the second capacitor 230 of FIGS. 2-10 begins to charge, the output current begins to decrease.

At a second time 1240, the controller 240 configures the control voltages 1205 and 1215 to a value that disables the transistors 215 and 245. At the second time 1240, the first inductor current 1220 transitions from increasing to decreasing, such that the first inductor 220 begins to discharge the energy stored between the times 1235 and 1240. At the second time 1240, the second inductor current 1225 transitions from discharging to a set value, such that the second inductor 250 is approximately completely discharged. At the second time 1240, the rate at which the output current 1230 is decreasing increases, such that the current supplied to the supply output terminal 235 decreases at a rate faster than between the times 1235 to 1240. Advantageously, the output current 1230 does not have a current spike at the second time as the result of the second inductor current 1225 being approximately 0 amps (A) before a voltage is applied across the second transistor 225, such that the body diode of the second transistor 225 is approximately completely discharged.

At a third time 1245, the controller 240 configures the third control voltage 1215 to enable the third transistor 245. At the third time 1245, the current flowing through the second inductor 250 begins to increase as a response to enabling the third transistor 245. The current flowing through the second inductor 250 is a result of transferring energy from the output capacitance of the first transistor 215 and the energy stored in the body diode of the second transistor 225. Advantageously, the energy stored in the transistors 215 and 225 is transferred to the second inductor 250 as a result of enabling the third transistor 245.

At a fourth time 1250, the controller 240 configures the first control voltage 1205 to enable the first transistor 215. At the fourth time 1250, the controller 240 configures the second control voltage 1210 to disable the second transistor 225, such that the inductors 220 and 250 are disconnected from the supply output terminal 235. At the fourth time 1250, the first inductor current 1220 transitions from decreasing to increasing, such that the first inductor 220 begins to charge. At the fourth time 1250, the second inductor current 1225 transitions from increasing to decreasing, such that the second inductor 250 begins to discharge. The output current 1230 transitions from a magnitude approximately equal to zero to a value determined by the discharge of the second inductor 250 through the diode 255. At the fourth time 1250, the output current 1230 is supplied by the energy stored in the second inductor 250 during the interval between times 1245 and 1250. Advantageously, the energy stored in the second inductor 250 is supplied to the supply output terminal 235, such that the energy stored in the output capacitance of the first transistor 215 and the body diode of the second transistor 225 does not cause a current spike on the supply output terminal 235. Advantageously, the inductance of the first inductor 220 being close to the inductance of the second inductor 250 enables the second inductor current 1225 to increase enough as to charge the second capacitor 230, such that the second capacitor 230 remains charged enough to prevent a current spike on the supply output terminal 235.

Figure 13:
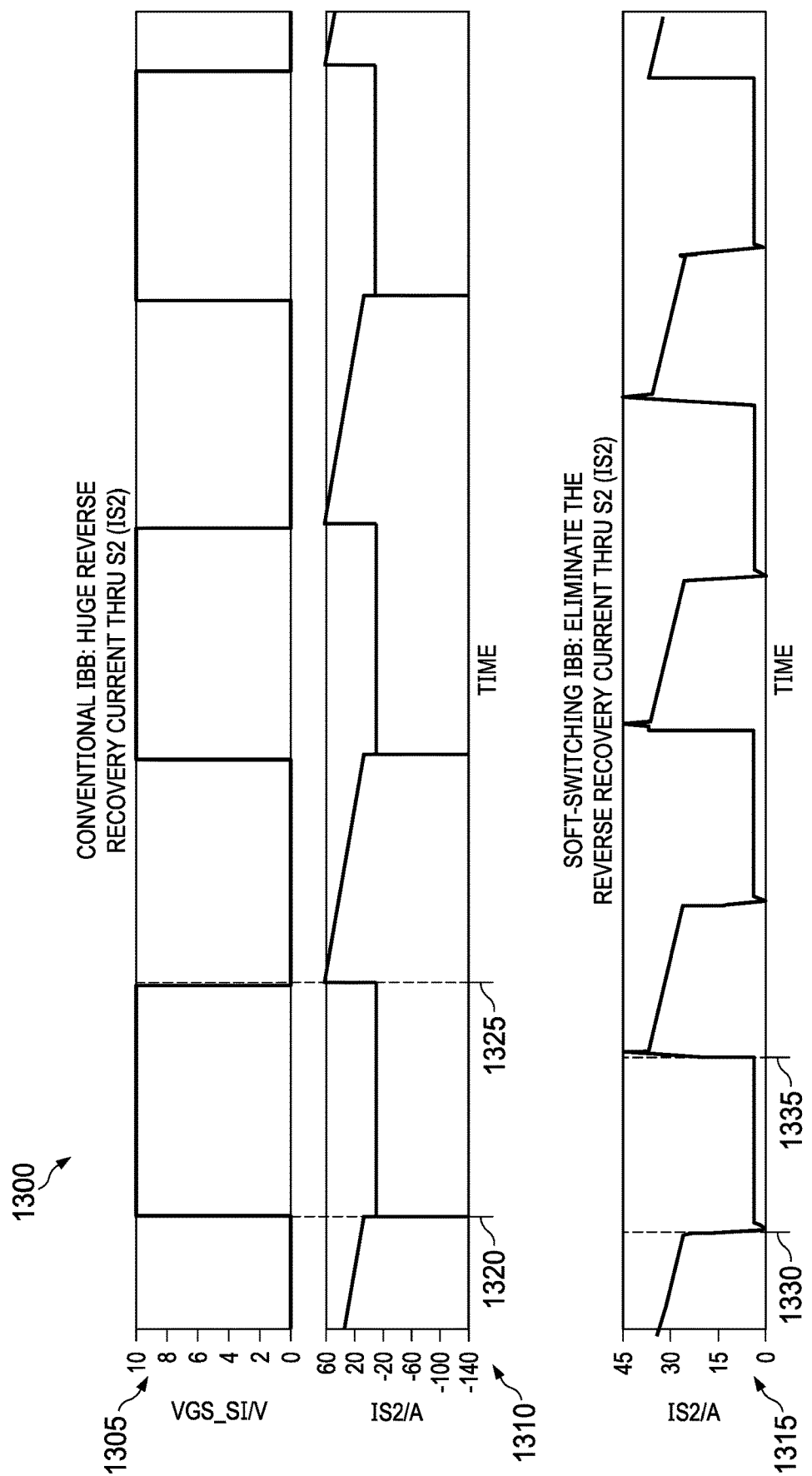
FIG. 13 is a timing diagram of a third example operation of the IBB converter of FIGS. 1 and 2 and a conventional IBB converter.

FIG. 13 is a timing diagram 1300 of a third example operation of the IBB converter 105 of FIGS. 1 and 2 and a conventional IBB converter. The timing diagram 1300 of FIG. 13 includes an example control voltage (VGS_S1N) 1305, an example first transistor current (IS2/A) 1310, and a second transistor current (IS2/A) 1315. The timing diagram 1300 is configured to represent the reverse recovery current through the second transistor 225 with and without the auxiliary circuit 205 of FIGS. 2 and 3.

In the timing diagram 1300 of FIG. 13, the control voltage 1305 is configured to represent a voltage of the control terminal 215B of the first transistor 215 during an example operation of the IBB converter 105 without the operation of the auxiliary circuit 205 of FIG. 2, such that at a first time 1320, the first transistor 215 is enabled by the voltage of the control voltage 1305. The control voltage 1305 is configured to represent a voltage over time.

The first transistor current 1310 is configured to represent the current flowing through the second transistor 225 of FIG. 2 during an example operation of the IBB converter 105 in which the auxiliary circuit 205 is not enabled by the controller 240 of FIG. 2. The first transistor current 1310 is configured to represent a magnitude of the current through the second transistor 225 over time. At the first time 1320, the first transistor current 1310 transitions from a positive magnitude to a negative magnitude in a seemingly instantaneous manner, such that the change in the first transistor current 1310 appears to happen as a spike in current. The first transistor current 1310 quickly returns to a positive magnitude immediately following the first time 1320. At the first time 1320, the first transistor current 1310 depicts a reverse recovery of the second transistor 225, such that energy is wasted, and a current spike is produced on the supply output terminal 235.

At a second time 1325, the control voltage 1305 is configured by the controller 240 to disable the first transistor 215. At the second time 1325, the first transistor current 1310 almost instantaneously increases its magnitude from approximately a value of zero amps to approximately a positive 70 amps. The first transistor current 1310 begins to decrease during the duration of time immediately following the second time 1325. The first transistor current 1310 continues to decrease until another reverse recovery occurs similar to that at the first time 1320.

The second transistor current 1315 is configured to represent a magnitude of a current flowing through the second transistor 225 during example operation of the IBB converter 105 with the auxiliary circuit 205 being implemented as described in FIG. 12. At a third time 1330, the second transistor current transitions from a decreasing positive magnitude of approximately 25 amps to approximately negative 5 amps immediately following the third time 1330. Advantageously, the auxiliary circuit 205 is able to reduce the reverse recovery of the second transistor current 1315 compared to the first transistor current 1310 in which the auxiliary circuit 205 was disabled.

At a fourth time 1335, the second transistor current 1315 transitions from a magnitude approximately equal to zero to a positive magnitude of approximately 45 Amps immediately following the fourth time 1335. The transition of second transistor current 1315 represents a zero-voltage switching (ZVS) of the second transistor 225, such that approximately zero current is flowing through the second transistor 225 during the transition between being disabled to enabled. Advantageously, the inclusion of the auxiliary circuit 205 reduces the impact of reverse recovery on the second transistor 225. Advantageously, the inclusion of the auxiliary circuit 205 enables the controller 240 to implement a method of switching, which enables the second transistor 225 to implement zero-voltage switching.

FIG. 14 is a timing diagram 1400 of a fourth example operation of the IBB converter 105 of FIGS. 1 and 2. The timing diagram 1400 includes an example control voltage (Vgs_S1) 1405, an example drain to source voltage (Vds_S1) 1410, and an example transistor current (I_aux) 1415. In the example of the timing diagram 1400, the IBB converter 105 is configured to include the inductors 220 and 250 of FIG. 2, such that the inductance of the first inductor 220 divided by the inductance of the second inductor 250 is equal to approximately 500 similarly to the IBB converter 105 operation of FIG. 11.

In the example of the timing diagram 1400 of FIG. 14, the control voltage 1405 is configured to represent a voltage applied to the control terminal 215B of the first transistor 215 of FIG. 2 minus the voltage applied to the second current terminal 215C of the first transistor 215, such that the control voltage 1405 is configured to enable or disable the first transistor 215.

The drain to source voltage 1410 is configured to represent a voltage difference between the first current terminal 215A of the first transistor 215 and the second current terminal 215C of the first transistor 215. In example operation, the drain to source voltage 1410 is configured to represent the current flowing through the first transistor 215 times the inverse of the transconductance of the first transistor 215 during the time in which the control voltage 1405 is configured to enable the first transistor 215.

The transistor current 1415 is configured to represent the current flowing through the third transistor 245 of FIG. 2. At an example first time 1420, the transistor current transitions from remaining at approximately zero amps to an increasing value, such that the third transistor 245 is enabled by the controller 240 of FIG. 2. At the first time 1420, the control voltage 1405 is configured to disable the first transistor 215, such that the transistor current 1415 is configured to charge the first capacitor 210.

At a second time 1425, the drain to source voltage 1410 transitions from a fixed voltage indicating that the first transistor 215 is disabled by the control voltage 1405 to a decreasing value, such that the voltage of the first current terminal 215A of the first transistor 215 is approaching the voltage of the second current terminal 215C as a result of the transistor current 1415 charging the first capacitor 210 and the second inductor 250 approaching being fully charged. Advantageously, the first transistor 215 may implement zero-voltage switching as a result of the first capacitor 210 and second inductor 250 modifying the voltage of the first current terminal 215A to a value closer to when the first transistor 215 is enabled.

At a third time 1430, the control voltage 1405 transitions from a value that disables the first transistor 215 to a value which would enable the first transistor 215 based on the voltage applied to the control terminal 215B by the controller 240. At the third time 1430, the drain to source voltage 1410 of the first transistor 215 has decreased enough to be approximately equal to the voltage during a duration in which the first transistor 215 is enabled. Advantageously, the first transistor 215 is able to exhibit zero-voltage switching as a result of the transistor current 1415 fully charging the first capacitor 210 and the second inductor 250 to a value which decreases the difference between the current terminals 215A and 215C.

Figure 15A:
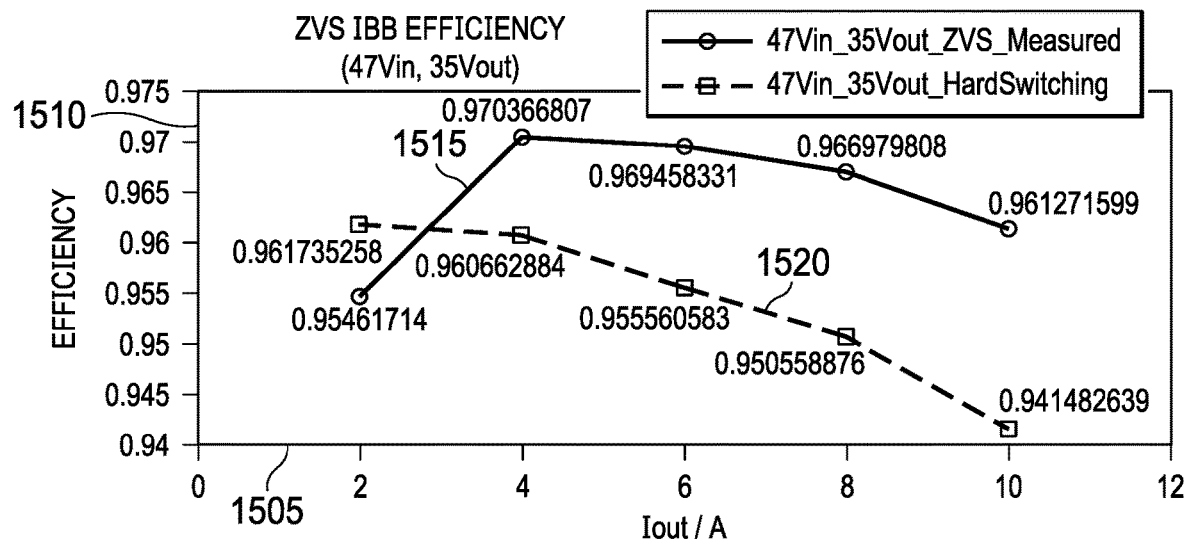
FIG. 15A is a plot of an example power efficiency of the IBB converter of FIGS. 1 and 2 during a fifth example operation.

FIG. 15A is a plot 1500 of an example power efficiency of the IBB converter 105 of FIGS. 1 and 2 during a fifth example operation. In the example of FIG. 15A, the plot 1500 is configured to represent a comparison of an example power efficiency based on an output current supplied by a conventional IBB converter and the IBB converter 105. The plot 1500 includes a horizontal axis (Iout/A) 1505 and a vertical axis (percent) 1510. The horizontal axis 1505 is configured to represent the current (in amps) supplied to the supply output terminal 235 of FIG. 2. The vertical axis 1510 is configured to represent the efficiency of the power supplied to the supply output terminal 235 divided by the power supplied to the supply input terminal 110. The plot 1500 represents example operation in which the voltage of the supply input terminal 110 is approximately 47 volts and the voltage of the supply output terminal 235 is approximately 35 volts. The plot 1500 includes an example first IBB converter efficiency 1515 and a second IBB converter efficiency 1520.

In the example of FIG. 15A, the first IBB converter efficiency 1515 is configured to represent the efficiency of the IBB converter 105. The second IBB converter efficiency 1520 is configured to represent an example conventional IBB converter, such that the auxiliary circuit 205 of FIG. 2 is not in the conventional IBB converter.

The first IBB converter efficiency 1515 is lower than the second IBB converter efficiency 1520 when the current supplied to the supply output terminal 235 is below approximately 3 amps. The first IBB converter efficiency 1515 is greater than the second IBB converter efficiency 1520 when the current supplied to the supply output terminal 235 is greater than approximately 3 amps. Advantageously, the inclusion of the auxiliary circuit 205 in the IBB converter 105 increases the power efficiency of the IBB converter 105 in applications that have 47 volts provided to the supply input terminal 110 and 35 volts at 10 amps supplied to the supply output terminal 235. Advantageously, the inclusion of the auxiliary circuit 205 increases the efficiency of the IBB converter 105 compared to a conventional IBB converter in some example applications.

Figure 15B:
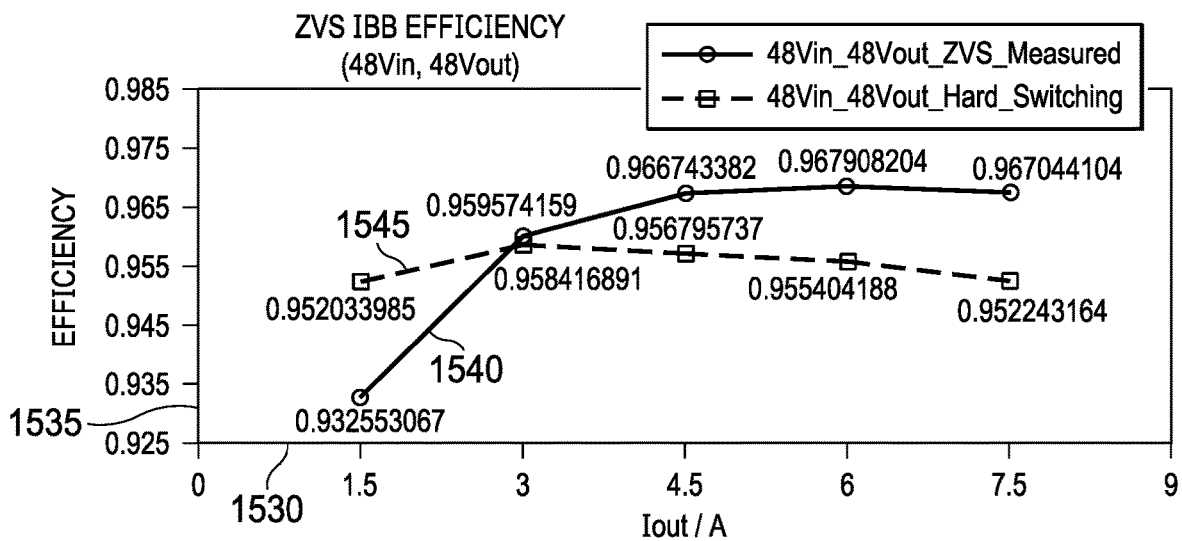
FIG. 15B is a plot of an example power efficiency of the IBB converter of FIGS. 1 and 2 during a sixth example operation.

FIG. 15B is a plot 1525 of an example power efficiency of the IBB converter 105 of FIGS. 1 and 2 during a sixth example operation. In the example of FIG. 15B, the plot 1525 is configured to represent a comparison of an example power efficiency based on an output current supplied by a conventional IBB converter and the IBB converter 105. The plot 1525 includes a horizontal axis (Iout/A) 1530 and a vertical axis (percent) 1535. The horizontal axis 1530 is configured to represent the current (in amps) supplied to the supply output terminal 235 of FIG. 2. The vertical axis 1535 is configured to represent the efficiency of the power supplied to the supply output terminal 235 divided by the power supplied to the supply input terminal 110. The plot 1525 represents example operation in which the voltage of the supply input terminal 110 is approximately 48 volts and the voltage of the supply output terminal 235 is approximately 48 volts, such that the IBB converter 105 is not altering the input voltage. The plot 1525 includes an example first IBB converter efficiency 1540 and a second IBB converter efficiency 1545.

In the example of FIG. 15B, the first IBB converter efficiency 1540 is configured to represent the efficiency of the IBB converter 105. The second IBB converter efficiency 1545 is configured to represent an example conventional IBB converter, such that the auxiliary circuit 205 of FIG. 2 is not in the conventional IBB converter.

The first IBB converter efficiency 1540 is lower than the second IBB converter efficiency 1545 when the current supplied to the supply output terminal 235 is below approximately 3 amps. The first IBB converter efficiency 1540 is greater than the second IBB converter efficiency 1545 when the current supplied to the supply output terminal 235 is greater than approximately 3 amps. Advantageously, the inclusion of the auxiliary circuit 205 in the IBB converter 105 increases the power efficiency of the IBB converter 105 in applications that have 48 volts provided to the supply input terminal 110 and 48 volts at 10 amps supplied to the supply output terminal 235. Advantageously, the inclusion of the auxiliary circuit 205 increases the efficiency of the IBB converter 105 compared to a conventional IBB converter in some example applications, such as 48 volts to 48 volts at 3 amps conversion.

Figure 16:
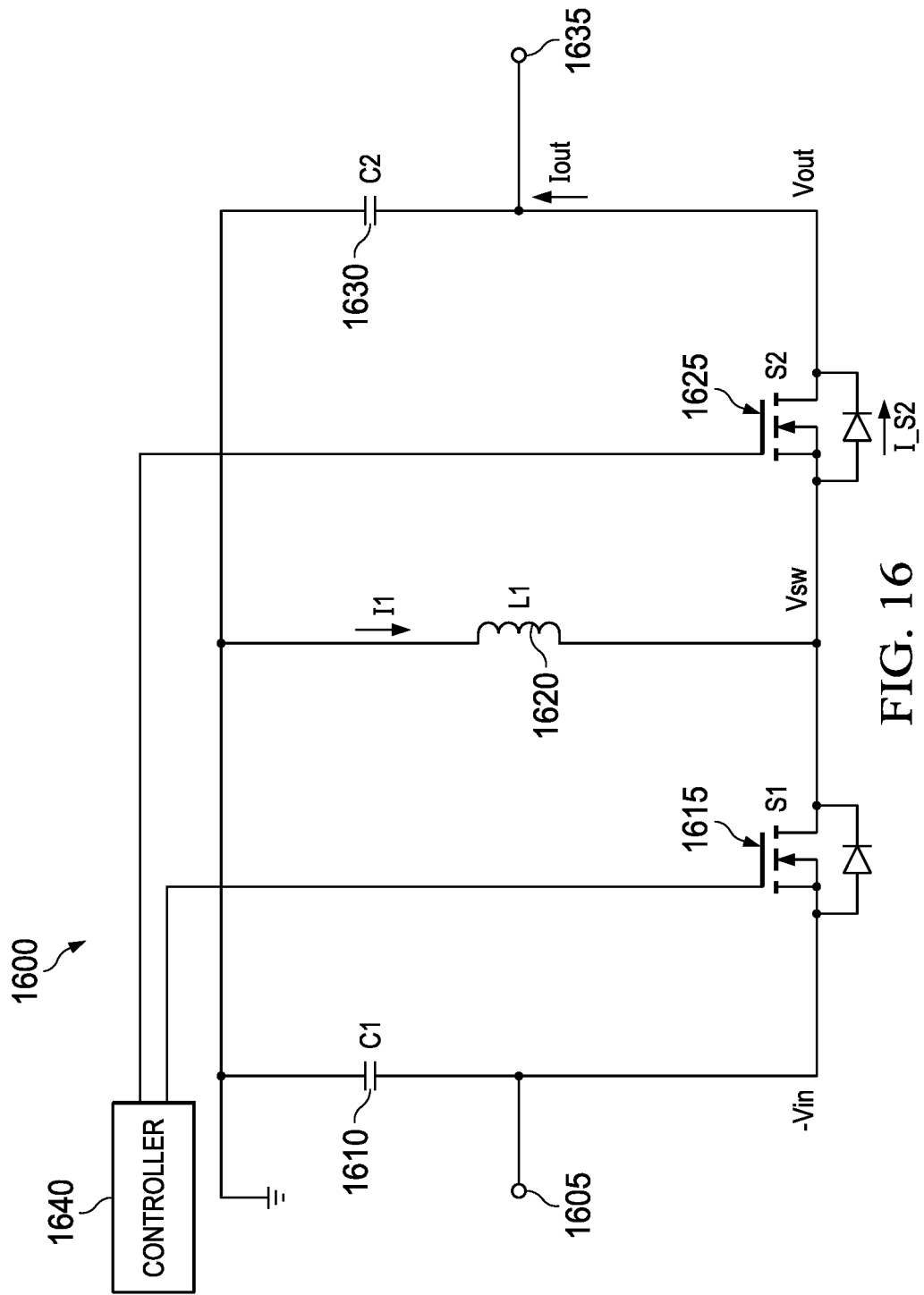
FIG. 16 is a schematic diagram of a conventional IBB converter.

FIG. 16 is a schematic diagram of a conventional IBB converter 1600. In the example of FIG. 16, the conventional IBB converter 1600 includes an example supply input terminal 1605, an example first capacitor 1610, an example first transistor 1615, an example inductor 1620, a second transistor 1625, a second capacitor 1630, an example supply output terminal 1635, and an example controller 1640. The conventional IBB converter 1600 is configured to convert the voltage supplied to the supply input terminal 1605 into a desired output voltage at the supply output terminal 1635.

The first capacitor 1610 is coupled between common potential (e.g., ground) and the supply input terminal 1605. The first transistor 1615 is coupled between the supply input terminal 1605 and the inductor 1620. The inductor 1620 is coupled between common potential and the second transistor 1625. The second transistor 1625 is coupled between the first transistor 1615 and the supply output terminal 1635. The second capacitor 1630 is coupled between common potential and the supply output terminal 1635. The controller 1640 is coupled to the transistors 1615 and 1625, such that the controller 1640 may enable and/or disable the transistors 1615 and 1625.

In example operation, the controller 1640 is configured to implement a switching method that includes the charging and discharging of the inductor 1620 to generate an output voltage at the supply output terminal 1635. For example, the controller 1640 may charge the inductor 1620 by enabling the first transistor 1615 and disabling the second transistor 1625. Alternatively, the controller 1640 may discharge the inductor 1620 by disabling the first transistor 1615 and enabling the second transistor 1625, such that the inductor 1620 supplies current to the supply output terminal 1635. The operation of the conventional IBB converter 1600 is represented by the first transistor current 1310 of FIG. 13 and by the second IBB converter efficiency 1520 and 1545 of FIGS. 15A and 15B. Advantageously, the IBB converter 105 of FIG. 1 is configured to include an auxiliary circuit 205 of FIG. 2, such that the efficiency of the IBB converter 105 is higher than that of the conventional IBB converter 1600. Advantageously, the IBB converter 105 includes the second inductor 250 of FIG. 2 configured to keep the second capacitor 230 charged enough to reduce a current spike on the supply output terminal 235 compared to the conventional IBB converter 1600 allowing the second capacitor 1630 to discharge into the supply output terminal 1635.

Figure 17:
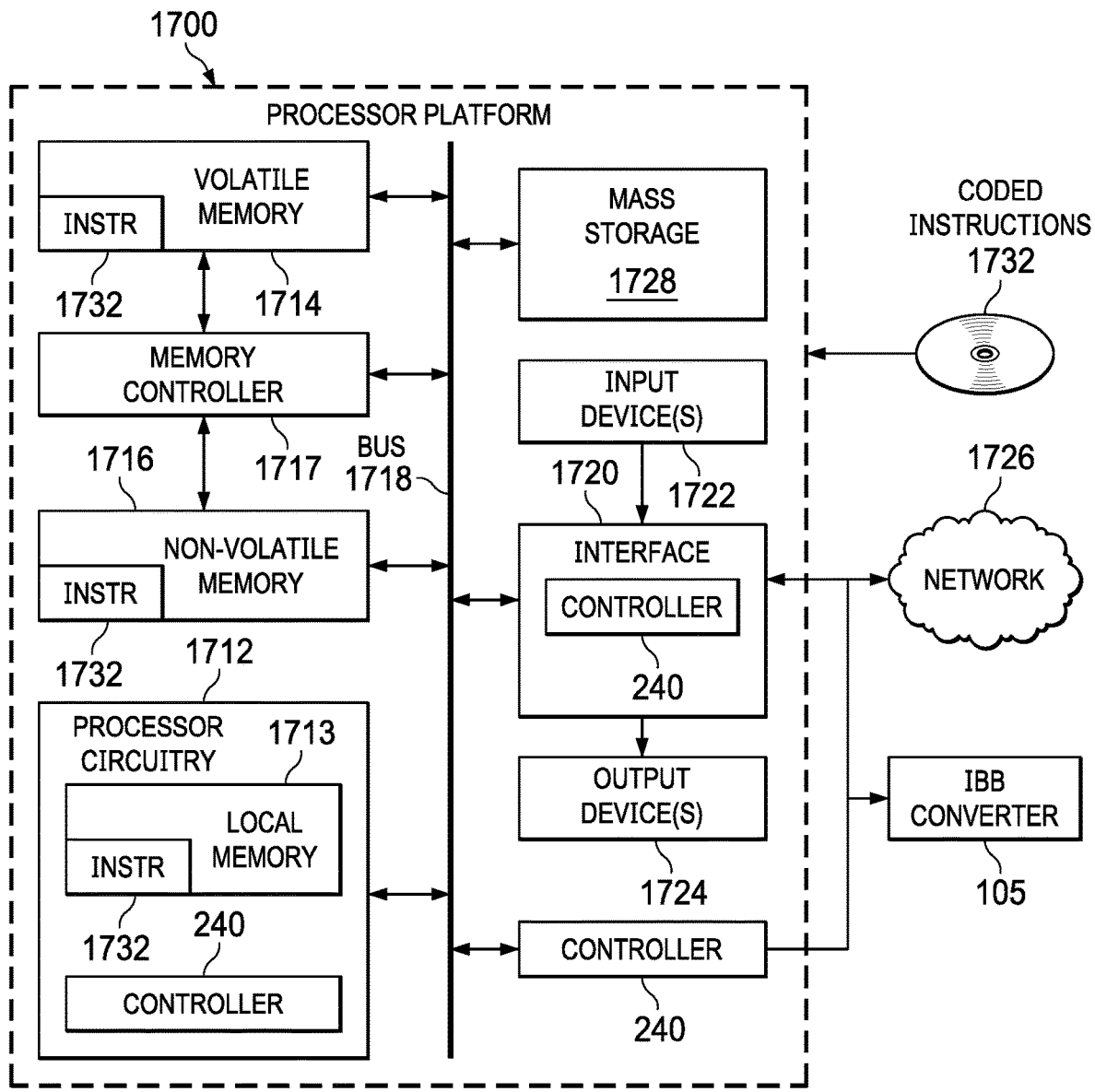
FIG. 17 is a block diagram of an example processing platform including processor circuitry structured to execute the example machine readable instructions and/or the example operations to implement the controller of FIG. 2.

FIG. 17 is a block diagram of an example processing platform including processor circuitry structured to execute the example machine readable instructions and/or the example operations to implement the controller of FIGS. 2-10. The processor platform 1700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1700 of the illustrated example includes processor circuitry 1712. The processor circuitry 1712 of the illustrated example is hardware. For example, the processor circuitry 1712 can be implemented by one or more integrated circuits, logic circuits, FPGAs, microprocessors, CPUs, GPUs, DSPs, and/or microcontrollers from any desired family or manufacturer. The processor circuitry 1712 may be implemented by one or more semiconductor based (e.g., silicon based) devices. In this example, the processor circuitry 1712 implements the controller 240. Alternatively, the controller 240 may be implemented in the interface 1720 or may be coupled directly between the IBB converter 105 and the BUS 1718.

The processor circuitry 1712 of the illustrated example includes a local memory 1713 (e.g., a cache, registers, etc.). The processor circuitry 1712 of the illustrated example is in communication with a main memory including a volatile memory 1714 and a non-volatile memory 1716 by a bus 1718. The volatile memory 1714 may be implemented by synchronous dynamic random access memory (SDRAM), dynamic random access memory (DRAM), RAMBUS® dynamic random access memory (RDRAM®), and/or any other type of RAM device. The non-volatile memory 1716 may be implemented by flash memory and/or any other desired type of memory device. Access to the main memory 1714, 1716 of the illustrated example is controlled by a memory controller 1717.

The processor platform 1700 of the illustrated example also includes interface circuitry 1720. The interface circuitry 1720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1722 are connected to the interface circuitry 1720. The input device(s) 1722 permit(s) a user to enter data and/or commands into the processor circuitry 1712. The input device(s) 1722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1724 are also connected to the interface circuitry 1720 of the illustrated example. The output device(s) 1724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1720 of the illustrated example, thus, typically includes a graphics driver card, a graphics driver chip, and/or graphics processor circuitry such as a GPU.

The interface circuitry 1720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1700 of the illustrated example also includes one or more mass storage devices 1728 to store software and/or data. Examples of such mass storage devices 1728 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The term "couple" is used throughout this description. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors are described herein, other transistors (or equivalent devices) may be used instead. For example, an p-channel FET ("FET") may be used in place of an n-channel FET with little or no changes to the circuit. Furthermore, other types of transistors may be used (such as bipolar junction transistors (BJTs)).

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless other-

What is claimed is:

1. An apparatus comprising:
a first capacitor including a first terminal and a second terminal, wherein the first terminal of the first capacitor is coupled to a ground terminal;
a second capacitor including a first terminal and a second terminal, wherein the first terminal of the second capacitor is coupled to the ground terminal and the first terminal of the first capacitor;
a first inductor with a first terminal and a second terminal, wherein the first terminal of the first inductor is coupled to the ground terminal;
a second inductor including a first terminal and a second terminal, wherein the second terminal of the second inductor is coupled to the second terminal of the first inductor;
a first switch having a first and second terminal, the first terminal of the first switch coupled to the second terminal of the first capacitor, and the second terminal of the first switch coupled to the second terminal of the first inductor and the second terminal of the second inductor;
a second switch having a third and fourth terminal, the third terminal of the second switch coupled to the second terminal of the second inductor and the second terminal of the first inductor, the fourth terminal of the second switch coupled to the second terminal of the second capacitor;
a third switch having a fifth and sixth terminal, the fifth terminal of the third switch coupled to the second terminal of the first capacitor, the sixth terminal of the third switch coupled to the first terminal of the second inductor; and
a diode having an anode terminal and a cathode terminal, wherein the anode terminal is coupled to the sixth terminal of the third switch and the first terminal of the second inductor, and the cathode terminal is coupled to the fourth terminal of the second switch and the second terminal of the second capacitor;
wherein the second inductor is coupled in parallel with the diode through activation of the second switch.

2. The apparatus of claim 1, wherein the first switch is an n-channel field effect transistor (NFET) coupled to a controller, and the controller is configured to control the transistor.

3. The apparatus of claim 1, wherein the second switch is an n-channel field effect transistor (NFET) coupled to a controller, and the controller is configured to control the transistor.

4. The apparatus of claim 1, wherein the third switch is an n-channel field effect transistor (NFET) coupled to a controller, and the controller is configured to control the transistor.

5. The apparatus of claim 1, wherein the first capacitor has a ninth terminal, the ninth terminal is coupled to a common potential.

6. The apparatus of claim 1, wherein the second capacitor is configured to be of a magnitude, such that the second inductor may charge the second capacitor to resist sudden changes in a voltage at the fourth terminal.

7. The apparatus of claim 1, wherein the first inductor has an inductance of a magnitude based on a relationship to an inductance of the second inductor.

8. The apparatus of claim 1, wherein the second inductor has an inductance of a magnitude based on a relationship to an inductance of the first inductor, such that a current supplied by the second inductor charges the second capacitor for a duration.

9. The apparatus of claim 1, wherein the diode allows current to flow from the second inductor to the fourth terminal as a result of being forward biased.

10. The apparatus of claim 1, wherein the second inductor charges the second capacitor as a result of the second switch and the third switch.

11. A system comprising:
a first capacitor including a first terminal and a second terminal, the first terminal of the first capacitor coupled to a ground;
a first switch coupled to the second terminal of the first capacitor and a first voltage potential;
a second switch coupled to the first switch and a second capacitor;
a third switch including a first terminal and a second terminal, the first terminal of the third switch coupled to an anode terminal of a diode and the second terminal of the third switch coupled to the second terminal of the first capacitor;
a first inductor coupled to the first capacitor, the second capacitor, the first switch, and the second switch;
a second inductor coupled to the third switch, a cathode terminal of the diode, the first inductor, the first switch, and the second switch; and
a controller coupled to respective control terminals of the first switch, the second switch, and the third switch;
wherein the controller is configured to control the first switch, the second switch, and the third switch to:
allow a current to flow through the first inductor and the first switch based on the first switch and the second switch;
allow the current to flow through the first inductor and the second switch based on the first switch and the second switch;
transfer power to the second inductor based on the third switch; and
transfer power from the second inductor based on the first switch and the third switch; and
wherein the second inductor is coupled in parallel with the diode through activation of the second switch and the third switch is coupled in parallel with the second inductor through the first switch.

12. The system of claim 11, wherein the controller is configured to enable the current to flow through the first inductor and the first switch as a result of enabling the first switch and disabling the second switch.

13. The system of claim 11, wherein the controller is configured to enable the current to flow through the first inductor and the second switch as a result of disabling the first switch and enabling the second switch.

14. The system of claim 11, wherein the controller is configured to transfer power from an output capacitor as a result of enabling the third switch.

15. The system of claim 11, wherein the controller is configured to supply a voltage to the second capacitor as a result of enabling the first switch.

16. The system of claim 11, wherein the first inductor includes a first inductance, the first inductance is greater than a second inductance of the second inductor.

17. The system of claim 11, wherein the controller is configured to transfer power from the second inductor to a capacitor as a result of enabling the first switch and disabling the third switch.

18. A system comprising:
- an inverting buck boost converter having a first control input, a second control input and a converter output;
- a first capacitor including a first terminal and a second terminal;
- a second capacitor including a first terminal and a second terminal, wherein the first terminal of the second capacitor is coupled to the first terminal of the first capacitor;
- a first inductor including a first terminal and a second terminal;
- a first switch including a first terminal and a second terminal, wherein the first terminal is coupled to the second terminal of the first capacitor, and the second terminal is coupled to the second terminal of the first inductor;
- a second switch including a third terminal and a fourth terminal, wherein the third terminal is coupled to the second terminal of the first inductor and the fourth terminal is coupled to the second terminal of the second capacitor;
- an auxiliary circuit having:
  - a third control input;
  - an auxiliary output coupled to the converter output;
  - a second inductor including a first terminal and a second terminal;
  - a diode including an anode terminal and a cathode terminal;
  - a third switch including a fifth terminal and a sixth terminal, wherein the fifth terminal is coupled to the second terminal of the first capacitor and the sixth terminal is coupled to the first terminal of the second inductor and the anode terminal of the diode, wherein the second inductor is coupled in parallel with the diode through activation of the second switch;
- a controller having a first control output, a second control output and a third control output, the first control output coupled to the first control input, the second control output coupled to the second control input, the third control output coupled to the third control input; and
- a power amplifier having a supply input, the supply input coupled to the converter output and the auxiliary output.

19. The system of claim 18, wherein the diode is configured to prevent power transfer from the converter output to the auxiliary circuit.

20. The system of claim 18, wherein the controller is configured to enable or disable the first switch, the second switch and the third switch in a continuous conduction mode (CCM).

* * * * *